(12) United States Patent
Murata et al.

(10) Patent No.: US 7,332,717 B2
(45) Date of Patent: Feb. 19, 2008

(54) INFRARED SENSOR AND INFRARED SENSOR ARRAY

(75) Inventors: Takahiko Murata, Osaka (JP); Takumi Yamaguchi, Kyoto (JP); Shigetaka Kasuga, Osaka (JP); Shinji Yoshida, Osaka (JP); Yoshito Ikeda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 10/580,534

(22) PCT Filed: Sep. 15, 2005

(86) PCT No.: PCT/JP2005/017070

§ 371 (c)(1),
(2), (4) Date: May 25, 2006

(87) PCT Pub. No.: WO2006/043384

PCT Pub. Date: Apr. 27, 2006

(65) Prior Publication Data

US 2007/0125949 A1   Jun. 7, 2007

(30) Foreign Application Priority Data

Oct. 18, 2004   (JP) .............................. 2004-303262

(51) Int. Cl.
*G01J 5/00* (2006.01)
(52) U.S. Cl. ................. 250/338.1; 250/339.1
(58) Field of Classification Search ............. 250/338, 250/271–288, 289–300
See application file for complete search history.

(56) References Cited

U.S. PATENT DOCUMENTS

| 4,745,278 | A | * | 5/1988 | Hanson | 250/338.2 |
| 4,792,681 | A | * | 12/1988 | Hanson | 250/338.2 |
| 4,902,895 | A | * | 2/1990 | Hanson | 250/338.2 |
| 5,324,944 | A | * | 6/1994 | Soch et al. | 250/338.3 |
| 5,757,008 | A | * | 5/1998 | Akagawa et al. | 250/370.08 |
| 5,965,886 | A | * | 10/1999 | Sauer et al. | 250/332 |
| 6,359,460 | B1 | | 3/2002 | Tanaka | |
| 6,762,398 | B1 | | 7/2004 | Tanaka | |

(Continued)

FOREIGN PATENT DOCUMENTS

JP    10-227689    8/1998

(Continued)

*Primary Examiner*—Kimberly D. Nguyen
*Assistant Examiner*—Kiho Kim
(74) *Attorney, Agent, or Firm*—McDermott Will & Emery LLP

(57) ABSTRACT

An infrared sensor includes a series capacitor element and a reference capacitor element each exhibiting a predetermined capacitance value; an infrared-detecting capacitor element whose capacitance value varies depending on an intensity of infrared light incident on the element; and an output node being a node at which a first terminal of the series capacitor element, a first terminal of the reference capacitor element and a first terminal of the infrared-detecting capacitor element are connected to one another. The intensity of infrared light is output as a potential difference between the reference potential which is brought to a potential by applying a predetermined voltage between the series capacitor element and the reference capacitor element and the detection potential which is brought to a potential by applying a predetermined voltage between the series capacitor element and the infrared-detecting capacitor element.

12 Claims, 17 Drawing Sheets

U.S. PATENT DOCUMENTS

2001/0012384 A1* 8/2001 Kalnitsky et al. ........... 382/124
2002/0005485 A1   1/2002 Hashimoto et al.
2003/0113783 A1*  6/2003 Funaki et al. .................. 435/6

FOREIGN PATENT DOCUMENTS

| | | |
|---|---|---|
| JP | 11-150683 | 6/1999 |
| JP | 11-271141 | 10/1999 |
| JP | 11-271142 | 10/1999 |
| JP | 2000-114467 | 4/2000 |
| JP | 2000-165748 | 6/2000 |
| JP | 2001-343282 | 12/2001 |
| JP | 2002-365130 | 12/2002 |

* cited by examiner

INFRARED SENSOR AND INFRARED SENSOR ARRAY

This application is the U.S. National Phase under 35 U.S.C. § 371 of International Application No. PCT/JP05/017070, filed Sep. 15, 2005, which in turn claims the benefit of Japanese Application No. 2004-303262, filed Oct. 18, 2004, the disclosures of which Applications are incorporated by reference herein in their entirety.

TECHNICAL FIELD

The present invention relates to an infrared sensor for detecting infrared light being radiated from an object or a human body.

BACKGROUND ART

An infrared sensor can detect infrared light being radiated from an object such as a human body. With the ability for non-contact detection of the existence or the temperature of an object, it is expected to find applications in a variety of fields of technology. Particularly, an infrared sensor array including a plurality of infrared sensors arranged in a matrix pattern is capable of obtaining a two-dimensional infrared light image, and is expected to find applications in an even wider variety of fields of technology. Favorable candidates for the infrared sensors used in such an infrared sensor array include resistive bolometers and dielectric bolometers detecting a change in the dielectric constant caused by a temperature change through the application of an electric field, because they do not require cooling or a chopper circuit.

Conventional resistive bolometers and dielectric bolometer-type infrared sensors with configurations as follows are known in the art (Patent Documents 1 and 2).

FIG. 17 shows a signal reading circuit of a conventional resistive bolometer-type infrared sensor. As a first switch 154A, a second switch 154B and a third switch 154C are turned ON, the difference between the output of a dummy resistor 152 and the output of a heat-sensitive resistor 151 is output to an output 160 of the signal reading circuit. In order to accurately read the value detected by the heat-sensitive resistor 151, the resistance value of the dummy resistor 152 needs to be constant. However, the resistance value of the dummy resistor 152 varies depending on the temperature of the semiconductor substrate, on which the dummy resistor 152 is formed. Thus, while it is necessary to accurately measure the temperature of the semiconductor substrate in order to correct a variation of the resistance value of the dummy resistor 152, it is not easy to precisely detect the temperature of the semiconductor substrate.

FIG. 18 shows a signal reading circuit of a conventional dielectric bolometer-type infrared sensor. As shown in FIG. 18, a reference capacitor element 201 and an infrared-detecting capacitor element 202 are connected in series with each other via a node 210. The infrared-detecting capacitor element 202 has characteristics such that the capacitance thereof varies depending on the intensity of infrared light incident on the element. The characteristics of the element are set so that the capacitance value of the infrared-detecting capacitor element 202 and that of the reference capacitor element 201 are equal to each other when there is no infrared light incident thereon.

An alternating-current power supply 204 and an alternating-current power supply 205 are connected to the reference capacitor element 201 and the infrared-detecting capacitor element 202 for driving the capacitor elements 201 and 202, respectively, wherein the alternating-current power supply 204 and the alternating-current power supply 205 have the same amplitude and inverted phases.

The node 210 is connected to an output terminal 206 via a transistor 203, and the potential of the node 210 can be taken out to the output terminal 206 by turning ON the transistor 203 via a signal line $S_{SW}$.

The potential of the node 210 is determined by the capacitances of the reference capacitor 201 and the infrared-detecting capacitor 202 and the voltages (amplitudes) of the alternating-current power supply 204 and the alternating-current power supply 205. Therefore, when infrared light is incident on the infrared-detecting capacitor element 202, whereby the capacitance value of the infrared-detecting capacitor element 202 increases as shown in FIG. 19, there is obtained an output curve as shown by an output curve A in FIG. 19. In FIG. 19, a curve C and a curve D represent output voltages of the alternating-current power supply 204 and the alternating-current power supply 205, respectively.

When there is no infrared light incident on the infrared-detecting capacitor element 202, the capacitance value of the reference capacitor element 201 and that of the infrared-detecting capacitor element 202 are equal to each other, whereby the potential of the node 210 is supposed to be always zero as indicated by B in FIG. 19. In practice, however, there is a difference on the order of 1%, due to the leak resistance component, variations occurring during the formation process, etc., between the capacitance value of the reference capacitor element 201 and that of the infrared-detecting capacitor element 202. Therefore, even if there is no infrared light incident on the sensor, there occurs an offset, being a spurious signal output.

Using the output of an infrared sensor as digital data requires an amplification by a factor of about 100. Then, the offset will also be amplified 100 times, which may saturate the amplifier circuit. It is also possible that the signal becomes hidden behind the substantial offset. Therefore, in order to realize a high-performance infrared sensor, it is necessary to correct and reduce the offset.

Patent Document 1: Japanese Laid-Open Patent Publication No. 10-227689

Patent Document 2: Japanese Laid-Open Patent Publication No. 2002-365130

DISCLOSURE OF THE INVENTION

Problems to be Solved by the Invention

However, in order to accurately read the value detected by the heat-sensitive resistor in the conventional resistive bolometer-type infrared sensor, the resistance value of the dummy resistor needs to be constant. However, the resistance value of the dummy resistor varies depending on the temperature of the semiconductor substrate, on which the dummy resistor is formed. Thus, while it is necessary to precisely detect the ambient temperature and the temperature of the semiconductor substrate in order to correct a variation of the resistance value of the dummy resistor, it is very difficult to precisely detect the temperature of the semiconductor substrate although it is easy to detect the ambient temperature.

With the conventional dielectric bolometer-type infrared sensor, it is necessary to correct the offset. However, where a plurality of infrared sensors are arranged in a matrix pattern to form an infrared sensor array, it is very difficult to correct the offset for each of some tens of thousands of infrared sensors.

While it is possible to correct the offset for the entire infrared sensor array by controlling the phase and amplitude of the power supply circuits for driving the infrared sensors, such a correction requires complicated driving circuits and arithmetic operation circuits.

An object of the present invention is to solve the problems in the prior art to thereby realize an infrared sensor and an infrared sensor array in which it is not necessary to correct temperature variations of a semiconductor substrate, and to realize an infrared sensor and an infrared sensor array with which it is possible to obtain a signal with a small offset and a large S/N ratio, the offset being a spurious signal output occurring when there is no infrared light incident on an infrared sensor, without complicating the circuit configuration.

Means for Solving the Problems

In order to achieve the object set forth above, an infrared sensor of the present invention includes an infrared-detecting capacitor element, a series capacitor element and a reference capacitor element, and has a configuration such that a signal is obtained as a potential difference.

Specifically, an infrared sensor of the present invention includes: a series capacitor element and a reference capacitor element each exhibiting a predetermined capacitance value; an infrared-detecting capacitor element whose capacitance value varies depending on an intensity of infrared light incident on the element; and an output node being a node at which a first terminal of the series capacitor element, a first terminal of the reference capacitor element and a first terminal of the infrared-detecting capacitor element are connected to one another, wherein: a potential of the output node is brought to a reference potential by applying a predetermined voltage between a second terminal of the series capacitor element and a second terminal of the reference capacitor element; a potential of the output node is brought to a detection potential by applying the predetermined voltage between the second terminal of the series capacitor element and a second terminal of the infrared-detecting capacitor element; and the intensity of infrared light is output as a potential difference between the reference potential and the detection potential.

With the infrared sensor of the present invention, the intensity of infrared light is output as the potential difference between the reference potential and the detection potential, whereby it is possible to reduce the offset, and it is not necessary to provide a special circuit for the offset correction. As a result, it is possible to realize a high-performance infrared sensor with a simple configuration. It is also possible to realize an infrared sensor and an infrared sensor array with which it is not necessary to correct the sensor output when there is a change in the temperature of the semiconductor substrate.

Preferably, in the infrared sensor of the present invention, the capacitance value of the series capacitor element and the capacitance value of the reference capacitor element are equal to the capacitance value of the infrared-detecting capacitor element when there is no infrared light incident on the infrared-detecting capacitor element. With such a configuration, it is possible to reliably reduce the offset.

Preferably, the infrared sensor of the present invention further includes: a reference capacitor element control switch provided between the first terminal of the reference capacitor element and the output node; and an infrared-detecting capacitor element control switch provided between the first terminal of the infrared-detecting capacitor element and the output node, wherein: a power supply for supplying the predetermined voltage is connected to the second terminal of the series capacitor element; the reference potential is obtained by turning ON the reference capacitor element control switch and turning OFF the infrared-detecting capacitor element control switch; and the detection potential is obtained by turning OFF the reference capacitor element control switch and turning ON the infrared-detecting capacitor element control switch. Thus, it is possible to reliably obtain the reference potential and the detection potential.

A first infrared sensor array of the present invention is directed to an infrared sensor array including a plurality of infrared sensors arranged in a two-dimensional matrix pattern, wherein each infrared sensor includes: a series capacitor element and a reference capacitor element each exhibiting a predetermined capacitance value; an infrared-detecting capacitor element whose capacitance value varies depending on an intensity of infrared light incident on the element; and an output node being a node at which a first terminal of the series capacitor element, a first terminal of the reference capacitor element and a first terminal of the infrared-detecting capacitor element are connected to one another, wherein: a potential of the output node is brought to a reference potential by applying a predetermined voltage between a second terminal of the series capacitor element and a second terminal of the reference capacitor element; a potential of the output node is brought to a detection potential by applying the predetermined voltage between the second terminal of the series capacitor element and a second terminal of the infrared-detecting capacitor element; and the intensity of infrared light is output as a potential difference between the reference potential and the detection potential.

Since the first infrared sensor array of the present invention includes a plurality of infrared sensors arranged in a two-dimensional matrix pattern, wherein each infrared sensor outputs the intensity of infrared light as the potential difference between the reference potential and the detection potential, it is possible to make the offsets of all the infrared sensors of the infrared sensor array small and uniform. Therefore, it is not necessary to provide a special circuit for the offset correction. As a result, it is possible to realize a high-performance infrared sensor array with a simple configuration.

Preferably, in the first infrared sensor array, the capacitance value of the series capacitor element and the capacitance value of the reference capacitor element are equal to the capacitance value of the infrared-detecting capacitor element when there is no infrared light incident on the infrared-detecting capacitor element. With such a configuration, it is possible to reliably reduce the offset of each infrared sensor.

Preferably, in the first infrared sensor array of the present invention, each infrared sensor includes: a reference capacitor element control switch provided between the first terminal of the reference capacitor element and the output node; and an infrared-detecting capacitor element control switch provided between the first terminal of the infrared-detecting capacitor element and the output node, wherein: a power supply for supplying the predetermined voltage is connected to the second terminal of the series capacitor element; the reference potential is obtained by turning ON the reference capacitor element control switch and turning OFF the infrared-detecting capacitor element control switch; and the detection potential is obtained by turning OFF the reference capacitor element control switch and turning ON the infrared-detecting capacitor element control switch. Thus, it is possible to reliably obtain the reference potential and the detection potential.

Preferably, the first infrared sensor array of the present invention further includes a differential circuit section for storing the reference potential and the detection potential, and for outputting a difference between the stored reference potential and the stored detection potential. With such a configuration, it is possible to reliably output the intensity of infrared light as a potential difference.

Preferably, the first infrared sensor array of the present invention further includes an impedance conversion circuit or an amplifier circuit provided between each output node and each differential circuit section. With such a configuration, it is possible to reliably eliminate the influence of the floating capacitance and the diffusion capacitance.

Preferably, in the first infrared sensor array of the present invention, a predetermined group of two or more of infrared sensors, among the plurality of infrared sensors, share at least one of the series capacitor element and the reference capacitor element. Preferably, a group of infrared sensors, among the plurality of infrared sensors, that are connected to the same row or the same column of the matrix pattern share at least one of the series capacitor element and the reference capacitor element.

With such a configuration, it is possible to reduce the number of reference capacitor elements, and thus to reduce the area occupied by the infrared sensor array. Since it is possible to increase the area of the infrared-detecting capacitor element without increasing the area occupied by the infrared sensor array, it is possible to increase the sensitivity.

Preferably, the first infrared sensor array of the present invention further includes: a sensor selecting circuit section for selecting one of the plurality of infrared sensors; and a charge storage circuit section for accumulating a charge according to the potential difference output from the selected infrared sensor over a predetermined number of times, and for outputting a charge obtained by combining together the charge accumulated over the predetermined number of times, wherein: the charge storage circuit section includes a plurality of capacitor elements connected between a terminal receiving the potential difference and a ground each via a switch therebetween; the charge storage circuit section includes a driving circuit for driving the switch; and a charge is stored in each capacitor element. With such a configuration, it is possible to reliably reduce noise and increase the S/N ratio.

A second infrared sensor array of the present invention is directed to an infrared sensor array including a plurality of infrared sensors arranged in a two-dimensional matrix pattern, wherein each infrared sensor includes: a series capacitor element exhibiting a predetermined capacitance value; an infrared-detecting capacitor element whose capacitance value varies depending on an intensity of infrared light incident on the element; and a selection switch connected between a first terminal of the series capacitor element and a first terminal of the infrared-detecting capacitor element; and each group of infrared sensors in the matrix pattern that are arranged along the same column share a series capacitor element.

With the second infrared sensor array of the present invention, each group of infrared sensors that are arranged along the same column share a series capacitor element, whereby there occurs substantially the same offset in each of infrared sensors that are arranged along the same column, and the offset correction can be done at once for each column. As a result, it is possible to easily realize an infrared sensor array with a simple configuration that is yet capable of very accurate temperature measurement. It is also possible to increase the area of the infrared-detecting capacitor element without increasing the area occupied by the infrared sensor array, whereby it is possible to obtain an infrared sensor array with a high sensitivity.

Effects of the Invention

With the infrared sensor of the present invention, it is possible to realize an infrared sensor and an infrared sensor array in which it is not necessary to correct a temperature change of the semiconductor substrate, and to realize an infrared sensor and an infrared sensor array capable of obtaining a signal with a small offset and a large S/N ratio without complicating the circuit configuration.

DESCRIPTION OF REFERENCE NUMERALS

Figure 1:
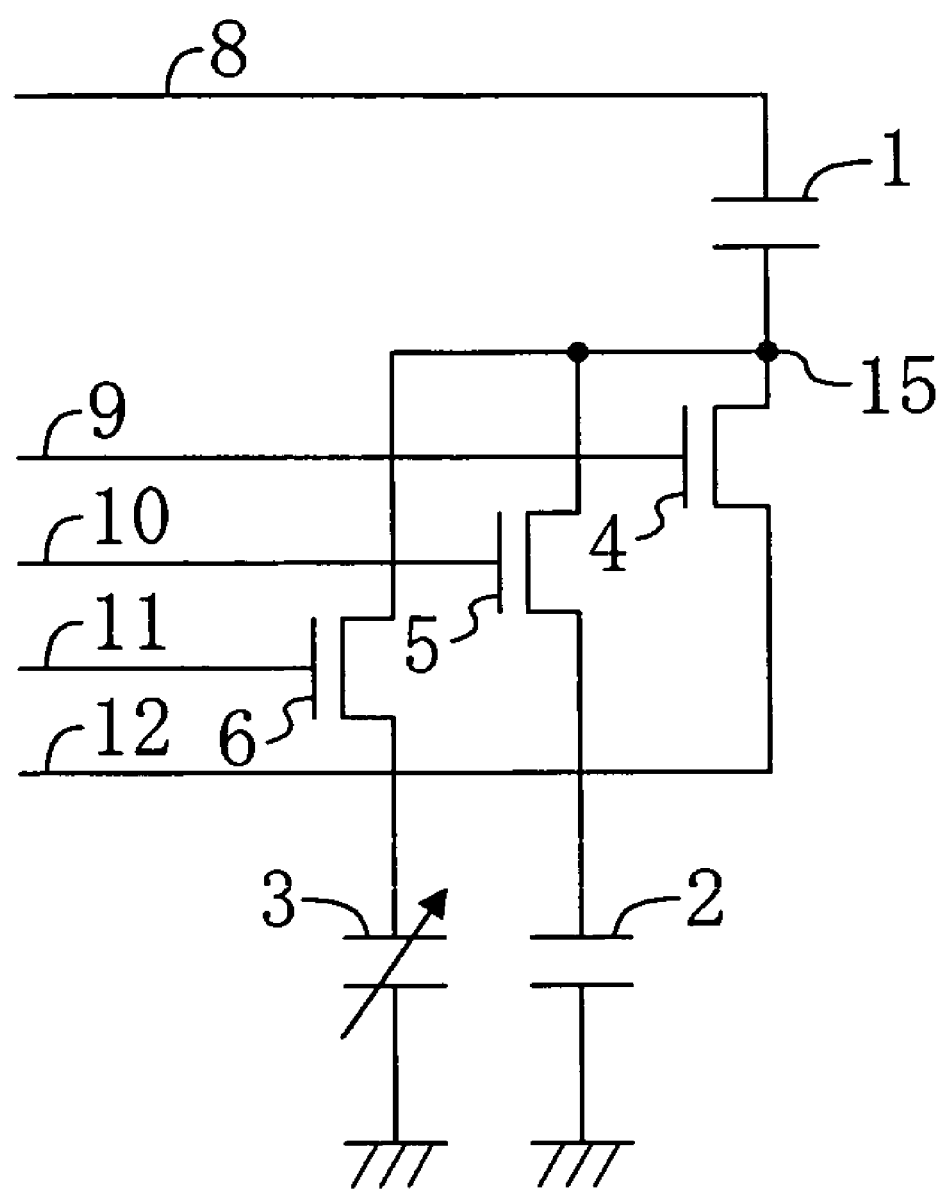
FIG. 1 is a basic circuit diagram showing an infrared sensor according to a first embodiment of the present invention.

1 Series capacitor element
2 Reference capacitor element
3 Infrared-detecting capacitor element
4 Bias control switch
5 Reference capacitor element control switch
6 Infrared-detecting capacitor element control switch
8 Power supply line
9 Bias control line
10 Reference capacitor element control line
11 Infrared-detecting capacitor element control line
12 Bias line
15 Output node
20 Infrared sensor
21 Infrared sensor
22 Infrared sensor
23 Infrared sensor
24 Power supply line switch
28 Vertical scanning and controlling section
29 First differential circuit section
30 Second differential circuit section
31 Common output line
32 Horizontal scanning section
33 First vertical scanning line
34 Second vertical scanning line
35 First horizontal scanning line
36 Second horizontal scanning line
37 Bias power supply
40 Infrared sensor
41 Infrared sensor
42 Infrared sensor
43 Infrared sensor
44 Infrared sensor
45 Infrared sensor
46 Infrared sensor
47 Infrared sensor
50A Series capacitor element
50B Series capacitor element
60 Infrared sensor
61 Infrared sensor
62 Infrared sensor
63 Infrared sensor
70A Series capacitor element
70B Series capacitor element
73 Infrared-detecting capacitor element
75 Output node
76 Selection switch
78 Power supply line
83 First vertical scanning line
84 Second vertical scanning line
90 Impedance conversion circuit or amplifier circuit
91 MOS transistor
92 MOS transistor
93 Source follower output node
101A Storage control switch
101B Storage control switch
101C Storage control switch
102A Charge storage capacitor element
102B Charge storage capacitor element
102C Charge storage capacitor element
103 Input terminal
104 Output control switch
105 Output terminal
106 Control circuit
111A Storage capacitor control line
111B Storage capacitor control line
111C Storage capacitor control line
115 Output control line

BEST MODE FOR CARRYING OUT THE INVENTION

First Embodiment

An infrared sensor according to a first embodiment of the present invention will now be described with reference to the drawings. FIG. 1 is a basic circuit diagram showing an infrared sensor of the present embodiment.

As shown in FIG. 1, in the infrared sensor of the present embodiment, a first terminal of a series capacitor element 1 is electrically connected to first terminals of a reference capacitor element 2 and an infrared-detecting capacitor element 3 via a reference capacitor element control switch 5 and an infrared-detecting capacitor element control switch 6, each being a MOS transistor, thus forming an output node 15. The capacitance value of the series capacitor element 1 and that of the reference capacitor element 2 are set so as to be substantially the same as the capacitance value of the infrared-detecting capacitor element 3 when there is no incident infrared light. Thus, these capacitance values are equal to one another within the range of their tolerance occurring when manufactured by a known manufacturing method.

A second terminal of the series capacitor element 1 is connected to a power supply line 8, and second terminals of the reference capacitor element 2 and the infrared-detecting capacitor element 3 are grounded. A reference capacitor element control line 10 and an infrared-detecting capacitor element control line 11 are connected to the gate of the reference capacitor element control switch 5 and the gate of the infrared-detecting capacitor element control switch 6, respectively. Also connected to the output node 15 is the drain of a bias control switch 4 whose gate is connected to a bias control line 9 and whose source is connected to a bias line 12.

Figure 2:
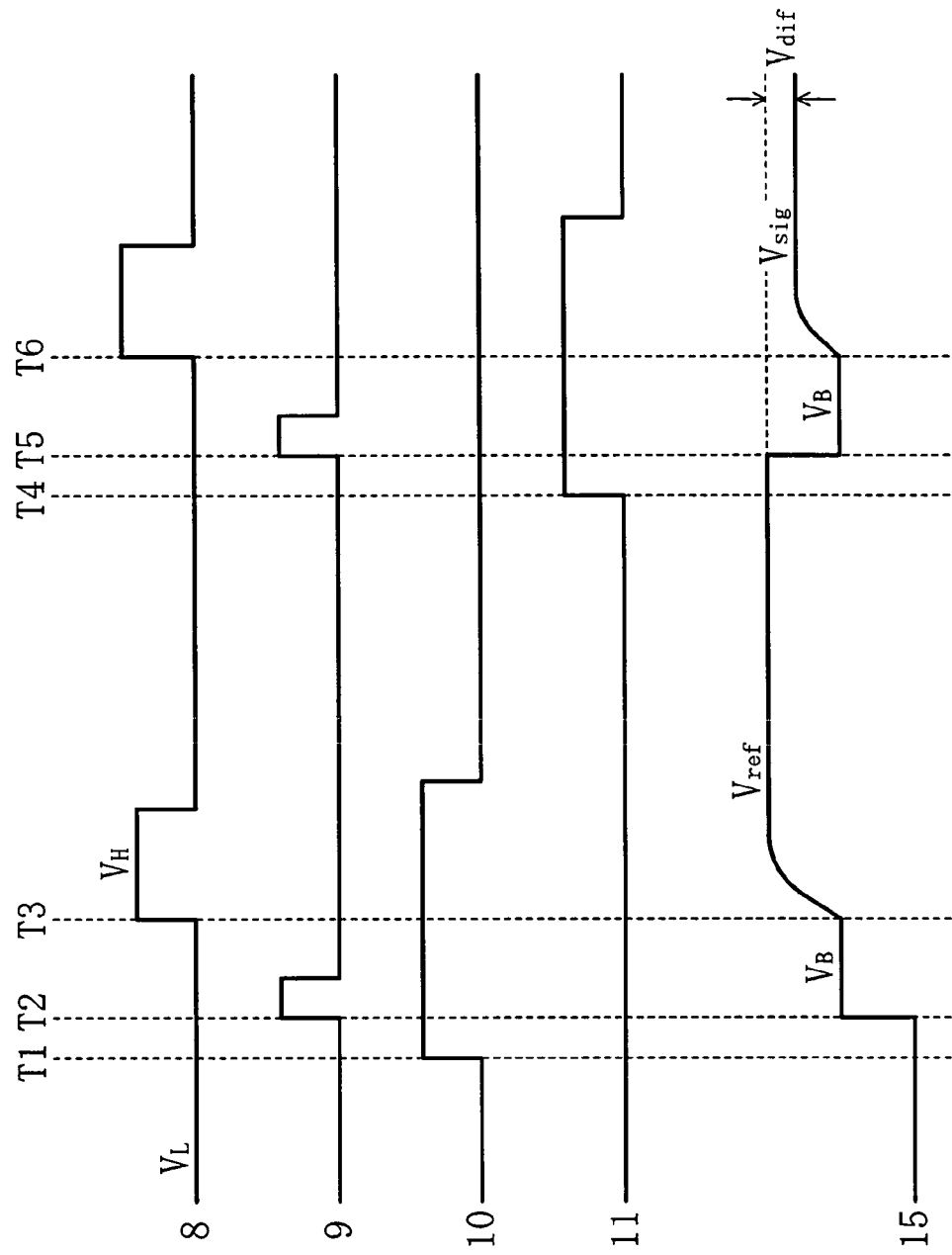
FIG. 2 is a timing diagram showing an operation of the infrared sensor according to the first embodiment of the present invention.

An operation of the infrared sensor of the present embodiment will now be described. FIG. 2 is a timing diagram showing an operation the infrared sensor of the present embodiment.

First, at time T1, the voltage of the reference capacitor element control line 10 is brought to a high ("H") level and the reference capacitor element control switch 5 is turned ON, thereby connecting the reference capacitor element 2 to the series capacitor element 1. Then, at time T2, the voltage of the bias control line 9 is brought to the "H" level, and the bias control switch 4 is turned ON, thereby bringing the voltage of the output node 15 to a bias voltage $V_B$.

Then, the voltage of the bias control line 9 is brought to a low ("L") level, after which the voltage of the power supply line 8 is raised from $V_L$ to $V_H$ at time T3. The voltage increase ($V_H - V_L$) of the power supply line 8 is distributed according to the capacitance ratio between the series capacitor element 1 and the reference capacitor element 2 and added to the voltage of the output node 15. In the infrared sensor of the present embodiment, since the capacitance value of the series capacitor element 1 is equal to that of the reference capacitor element 2, the voltage added to the output node 15 is ½ of ($V_H$–$V_L$). The voltage of the output node 15 in this state is defined as a reference potential $V_{ref}$.

Then, the voltage of the power supply line 8 is brought back to $V_L$, and the voltage of the reference capacitor element control line 10 is brought to the "L" level, thereby cutting off the reference capacitor element 2 from the series capacitor element 1 to end the measurement of the reference potential $V_{ref}$.

Then, at time T4, the voltage of the signal line 11 is brought to the "H" level and the infrared-detecting capacitor element control switch 6 is turned ON, thereby connecting the infrared-detecting capacitor element 3 to the series capacitor element 1. Then, at time T5, the voltage of the bias control line 9 is brought to the "H" level, thereby bringing the voltage of the output node 15 back to a level equal to the bias voltage $V_B$. Then, at time T6, the voltage of the power supply line 8 is raised from $V_L$ to $V_H$. Thus, the voltage difference ($V_H$–$V_L$) between $V_H$ and $V_L$ is distributed according to the capacitance ratio between the series capacitor element 1 and the infrared-detecting capacitor element 3 and added to the voltage of the output node 15. The voltage of the output node 15 in this state is defined as a detection potential $V_{sig}$.

When infrared light is incident on the infrared-detecting capacitor element 3, the capacitance value of the infrared-detecting capacitor element 3 increases according to the intensity of the incident infrared light. Therefore, as the intensity of the incident infrared light is higher, the voltage to be added to the output node 15 is lower and the potential difference between the detection potential $V_{sig}$ and the reference potential $V_{ref}$ is larger.

Therefore, it is possible to obtain the intensity of the infrared light incident on the infrared-detecting capacitor element 3 by obtaining a potential difference $V_{dif}$ between the reference potential $V_{ref}$ and the detection potential $V_{sig}$.

In the present embodiment, the intensity of infrared light incident on the infrared-detecting capacitor element 3 is obtained as the potential difference $V_{dif}$ between the reference potential $V_{ref}$, which occurs according to the capacitance ratio between the series capacitor element 1 and the reference capacitor element 2, and the detection potential $V_{sig}$, which occurs according to the capacitance ratio between the series capacitor element 1 and the infrared-detecting capacitor element 3. The capacitance value of the reference capacitor element 2 is set to be equal to the capacitance value of the infrared-detecting capacitor element 3 when there is no infrared light incident on the infrared-detecting capacitor element 3. Therefore, when there is no infrared light on the infrared-detecting capacitor element 3, the offset, being the difference between $V_{ref}$ and $V_{sig}$ is substantially zero.

Moreover, since it is possible to drive the infrared sensor only by giving a simple timing pulse, it is possible to simplify the circuit configuration. Therefore, where an infrared sensor array is provided by arranging a plurality of infrared sensors in a matrix pattern, it is possible to realize infrared sensors in which it is not necessary to provide complicated correction means. Moreover, it is possible to realize an infrared sensor and an infrared sensor array in which it is not necessary to correct the temperature of the semiconductor substrate on which an infrared sensor is formed.

Second Embodiment

Figure 3:
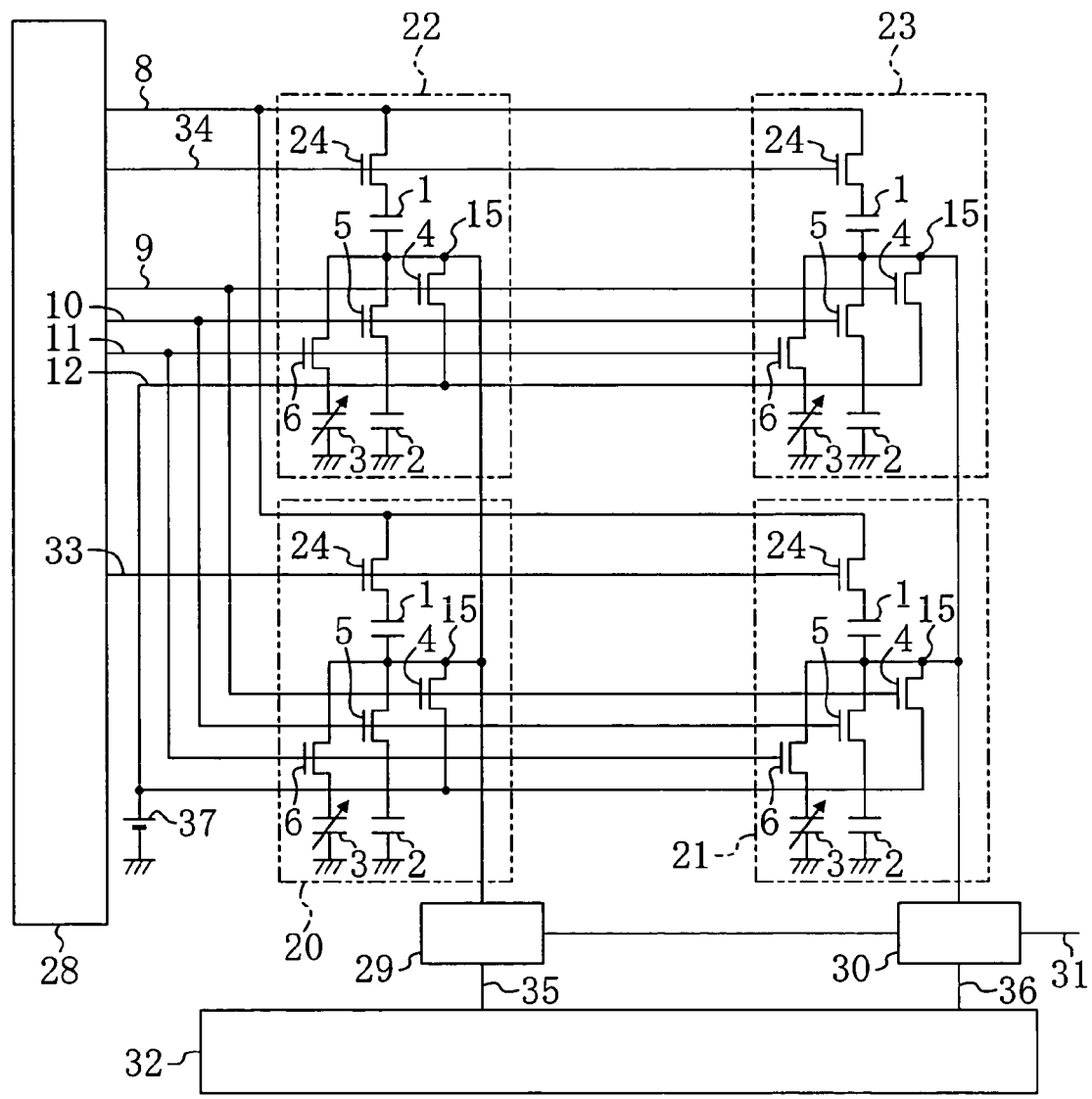
FIG. 3 is a basic circuit diagram showing an example of an infrared sensor array according to a second embodiment of the present invention.

A second embodiment of the present invention will now be described with reference to the drawings. FIG. 3 is a basic circuit diagram showing an infrared sensor array of the present embodiment.

In the present embodiment, four infrared sensors, i.e., an infrared sensor 20, an infrared sensor 21, an infrared sensor 22 and an infrared sensor 23, are arranged in a matrix pattern to form an infrared sensor array, as shown in FIG. 3. The basic configuration of each infrared sensor is the same as that of the first embodiment.

The bias control lines 9, the reference capacitor element control lines 10 and the infrared-detecting capacitor element control lines 11 of the infrared sensors 20 to 23 are commonly connected to a vertical scanning and signal controlling section 28. The bias lines 12 are all connected in parallel and are connected to a bias power supply 37. The power supply lines 8 are commonly connected to the vertical scanning and signal controlling section 28 via power supply line switches 24 each being a MOS transistor.

The gates of the power supply line switches 24 of the infrared sensor 20 and the infrared sensor 21 and the gates of the power supply line switch 24 of the infrared sensor 22 and the infrared sensor 23 are connected to the vertical scanning and signal controlling section 28 via a first vertical scanning line 33 and a second vertical scanning line 34, respectively.

The output nodes 15 of the infrared sensor 20 and the infrared sensor 22 are commonly connected to a first differential circuit section 29, and the output nodes 15 of the infrared sensor 21 and the infrared sensor 23 are commonly connected to a second differential circuit section 30. The first differential circuit section 29 and the second differential circuit section 30 are connected to a horizontal scanning section 32 via a first horizontal scanning line 35 and a second horizontal scanning line 36, respectively. The outputs of the first differential circuit section 29 and the second differential circuit section 30 are connected to a common output line 31.

Figure 4:
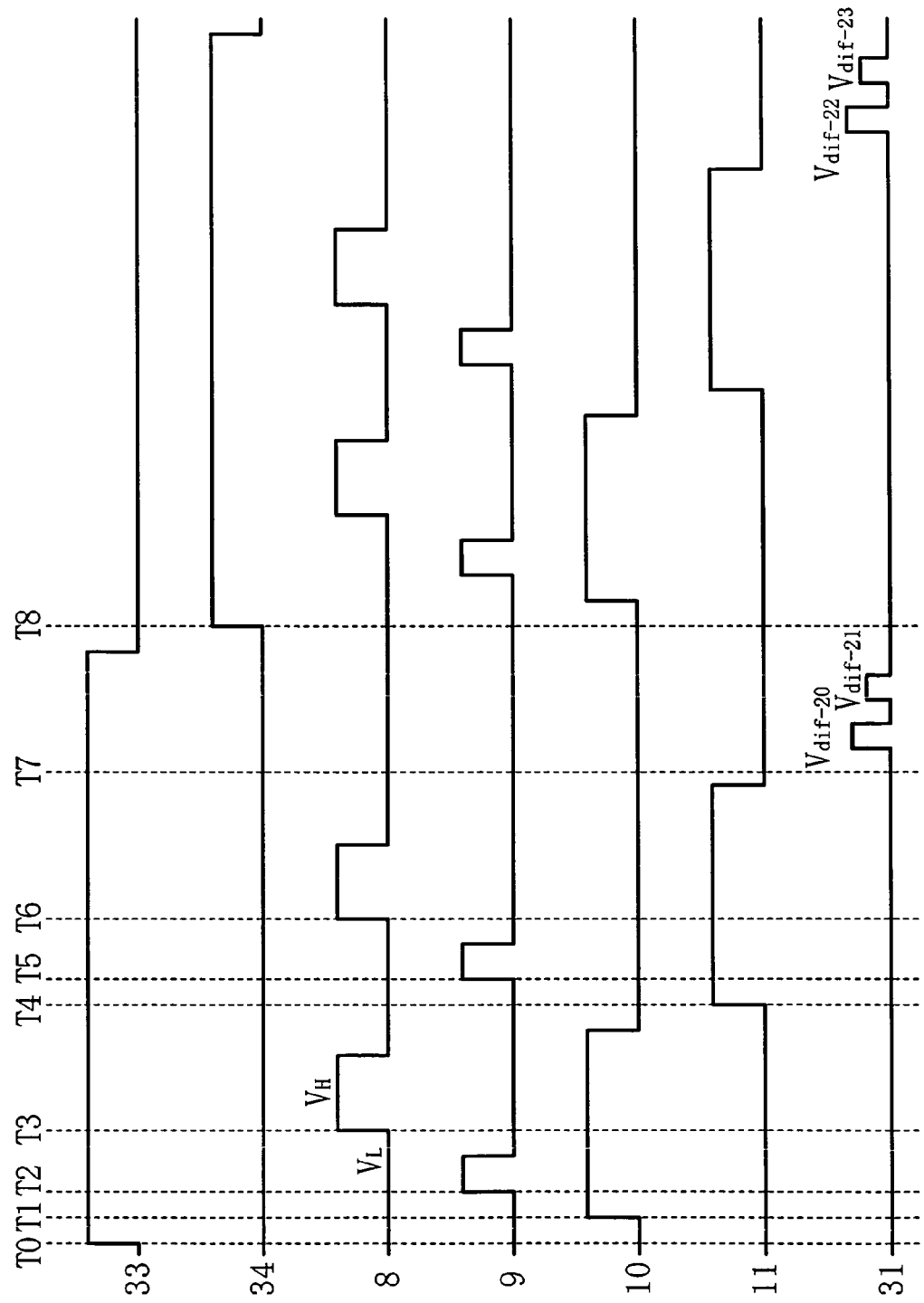
FIG. 4 is a timing diagram showing an operation of the infrared sensor array according to the second embodiment of the present invention.

An operation of the infrared sensor array of the present embodiment will now be described. FIG. 4 is a timing diagram showing an operation of the infrared sensor array of the present embodiment.

First, at time T0, the voltage of the first vertical scanning line 33 is brought to the "H" level, thereby connecting the infrared sensor 20 and the infrared sensor 21, forming the first row of the infrared sensor array, to the power supply line 8. Then, at time T1, the voltage of the reference capacitor element control line 10 is brought to "H", thereby connecting the series capacitor element 1 and the reference capacitor element 2 in series with each other. Then, at time T2, the voltage of the bias control line 9 is brought to the "H" level, thereby bringing the voltage of the output node 15 to the bias voltage $V_B$.

Then, the voltage of the bias control line 9 is brought to the "L" level, after which the voltage of the power supply line 8 is raised from $V_L$ to $V_H$ at time T3. Thus, a voltage of ½ of ($V_H$–$V_L$) is added to each of the output nodes 15 of the infrared sensor 20 and the infrared sensor 21 connected to the power supply line 8. This voltage is stored as the reference potential $V_{ref}$ in each of the first differential circuit section 29 and the second differential circuit section 30.

Then, the voltage of the power supply line 8 is brought back to $V_L$ and the voltage of the reference capacitor element control line 10 is brought to the "L" level, then, the voltage of the infrared-detecting capacitor element control line 11 is raised from $V_L$ to $V_H$ at time T4, thereby connecting the series capacitor element 1 and the infrared-detecting capacitor element 3 in series with each other at time T4. Then, the voltage of the bias control line 9 is brought to the "H" level at time T5, thereby bringing the voltage of the output node 15 back to the bias voltage $V_B$.

Then, the voltage of the bias control line 9 is brought to the "L" level, after which the voltage of the power supply line 8 is raised from $V_L$ to $V_H$. Thus, the voltages of the output nodes 15 of the infrared sensor 20 and the infrared sensor 21 connected to the power supply line 8 are each a voltage according to the intensity of light incident on the infrared-detecting capacitor element. This voltage is stored as the detection potential $V_{sig}$ in each of the first differential circuit section 29 and the second differential circuit section 30.

Then, the voltage of the power supply line 8 is brought back to $V_L$, and the voltage of the reference capacitor element control line 10 is brought to the "L" level. Then, a driving pulse is applied to the first horizontal scanning line 35, thereby making the first differential circuit section 29 output, as a signal output of the infrared sensor 20, the potential difference $V_{dif-20}$ between the reference potential $V_{ref}$ and the detection potential $V_{sig}$ to the common output line 31. Then, a driving pulse is applied to the second horizontal scanning line 36, thereby making the second differential circuit section 30 output, as a signal output of the infrared sensor 21, the potential difference $V_{dif-21}$ between the reference potential $V_{ref}$ and the detection potential $V_{sig}$ to the common output line 31. Then, the voltage of the first vertical scanning line 33 is brought to the "L" level, thereby completing the reading operation for the first row.

Then, at time T8, the voltage of the second vertical scanning line 34 is brought to the "H" level to select the infrared sensor 22 and the infrared sensor 23 along the second row of the matrix pattern, and an operation similar to that for the first row is repeated, thereby outputting the signal output $V_{dif-22}$ from the infrared sensor 22 and the signal output $V_{dif-23}$ from the infrared sensor 23 to the common output line 31.

In the infrared sensor array of the present embodiment, infrared sensors whose offset is substantially zero as shown in the first embodiment are arranged in a matrix pattern. Therefore, the offsets of the infrared sensors of the infrared sensor array are all substantially zero and have very small variations. Therefore, it is not necessary to provide complicated measures for correcting the offset, such as driving circuits, calculation circuits and driving procedures, whereby it is possible to simplify the circuit configuration. As a result, it is possible to easily realize an infrared sensor array with a simple configuration that is yet capable of very accurate temperature measurement.

While the present embodiment is directed to a case where infrared sensors are arranged in a 2×2 pattern, the number of rows and the number of columns are not limited to any particular number.

Third Embodiment

Figure 5:
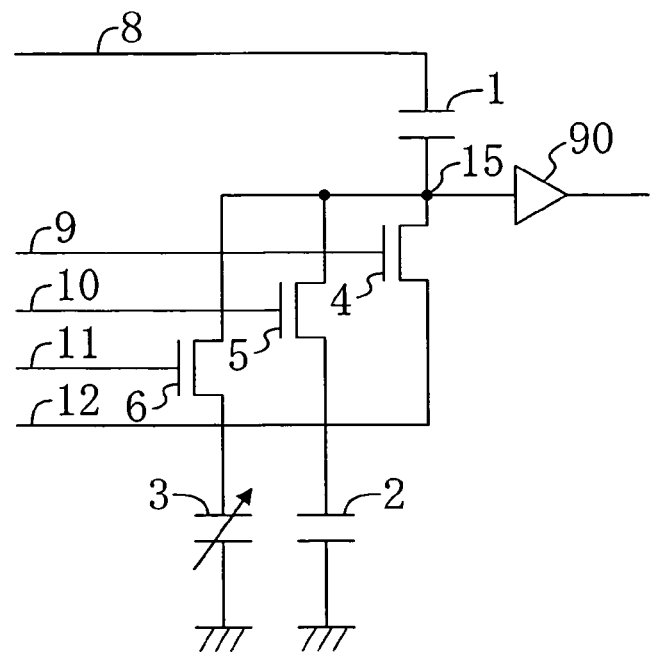
FIG. 5 is a basic circuit diagram showing an infrared sensor according to a third embodiment of the present invention.

A third embodiment of the present invention will now be described with reference to the drawings. FIG. 5 shows a basic circuit configuration of an infrared sensor of the present embodiment. As shown in FIG. 5, the infrared sensor of the present embodiment includes an output circuit 90, being an impedance conversion circuit or an amplifier circuit, provided downstream of the output node 15 shown in the first embodiment.

Figure 6:
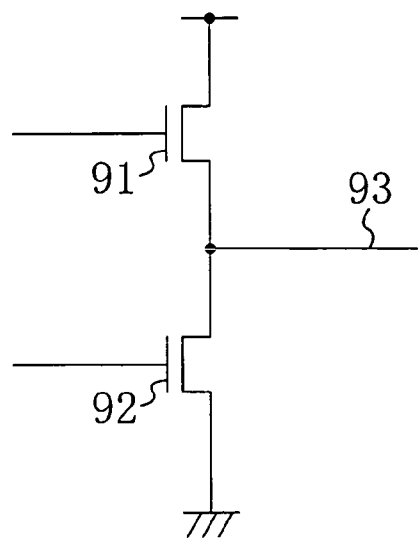
FIG. 6 is a basic circuit diagram showing an example of an impedance conversion circuit or an amplifier circuit used in the infrared sensor according to the third embodiment of the present invention.

FIG. 6 shows a source follower circuit as an example of the output circuit 90. As shown in FIG. 6, the source follower circuit includes an MOS transistor 91 and an MOS transistor 92 connected in series with each other between the power supply and the ground. The signal from the output node 15 is input to the gate of the transistor 91, and a bias voltage is applied to the gate of the transistor 92. With such a configuration, an impedance-converted signal is output to a source follower output node 93, being the node between the transistor 91 and the transistor 92.

Figure 7:
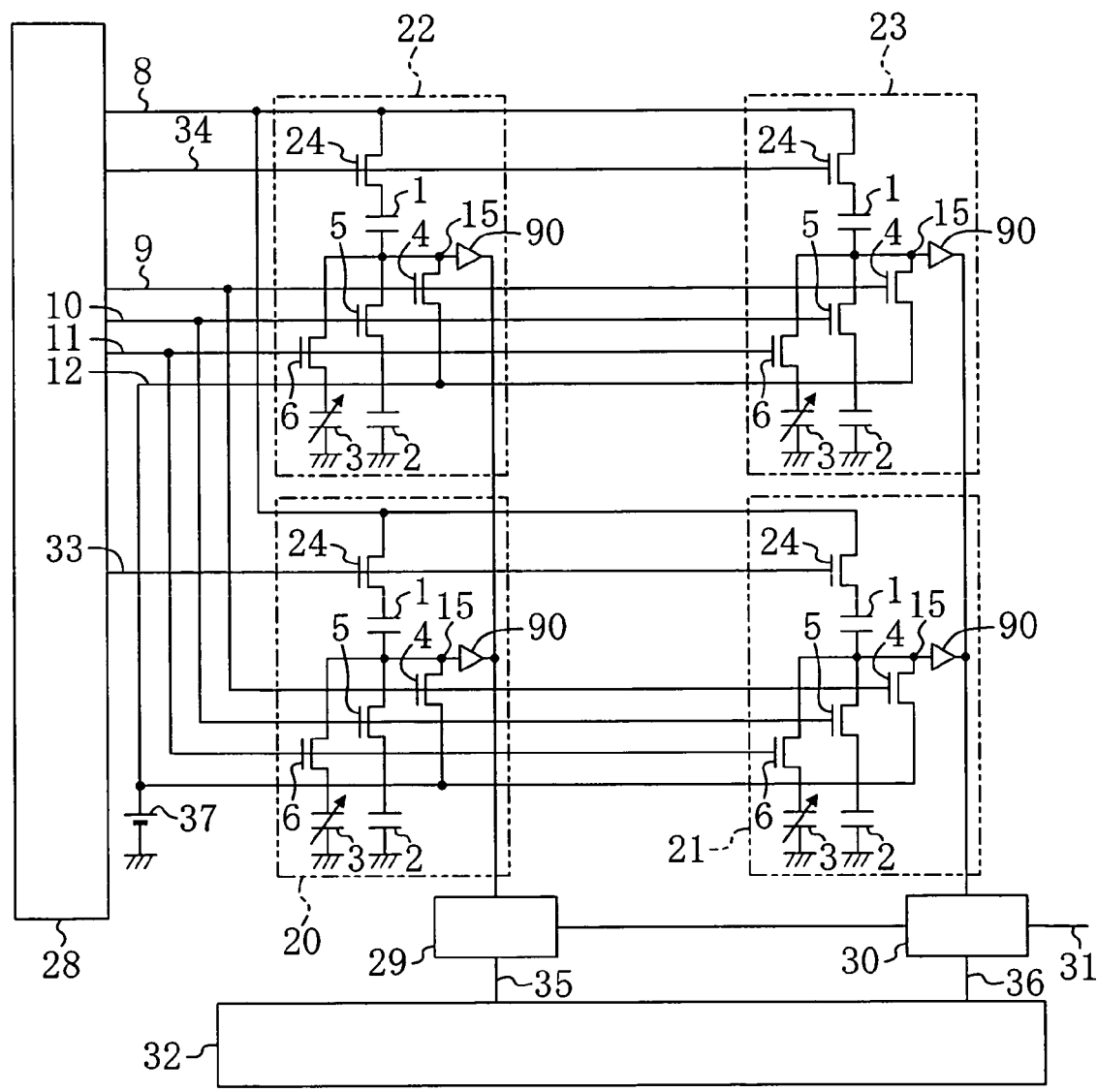
FIG. 7 is a basic circuit diagram showing an example of an infrared sensor array according to the third embodiment of the present invention.

FIG. 7 shows an example of a circuit configuration where infrared sensors of the present embodiment are arranged in a matrix pattern to form an infrared sensor array. As shown in FIG. 7, the output circuit 90 is provided downstream of the output node 15 of each infrared sensor of the infrared sensor array. If the output nodes 15 of the infrared sensors are connected to each other, the floating capacitance value and the diffusion capacitance value increase above the capacitance value of the infrared-detecting capacitor element, thereby lowering the signal output. In practice, the infrared sensors are arranged in an about 600×600 matrix pattern, for example, in which case there will be a very large number of infrared sensors in the infrared sensor array, i.e., 360,000. Then, the increase in the floating capacitance and the diffusion capacitance will not be negligible.

In the infrared sensor array of the present embodiment, however, the infrared sensors are connected to each other via the output circuits 90 therebetween, whereby it is possible to eliminate the influence of the floating capacitance and the diffusion capacitance, and to obtain a high output.

Fourth Embodiment

Figure 8:
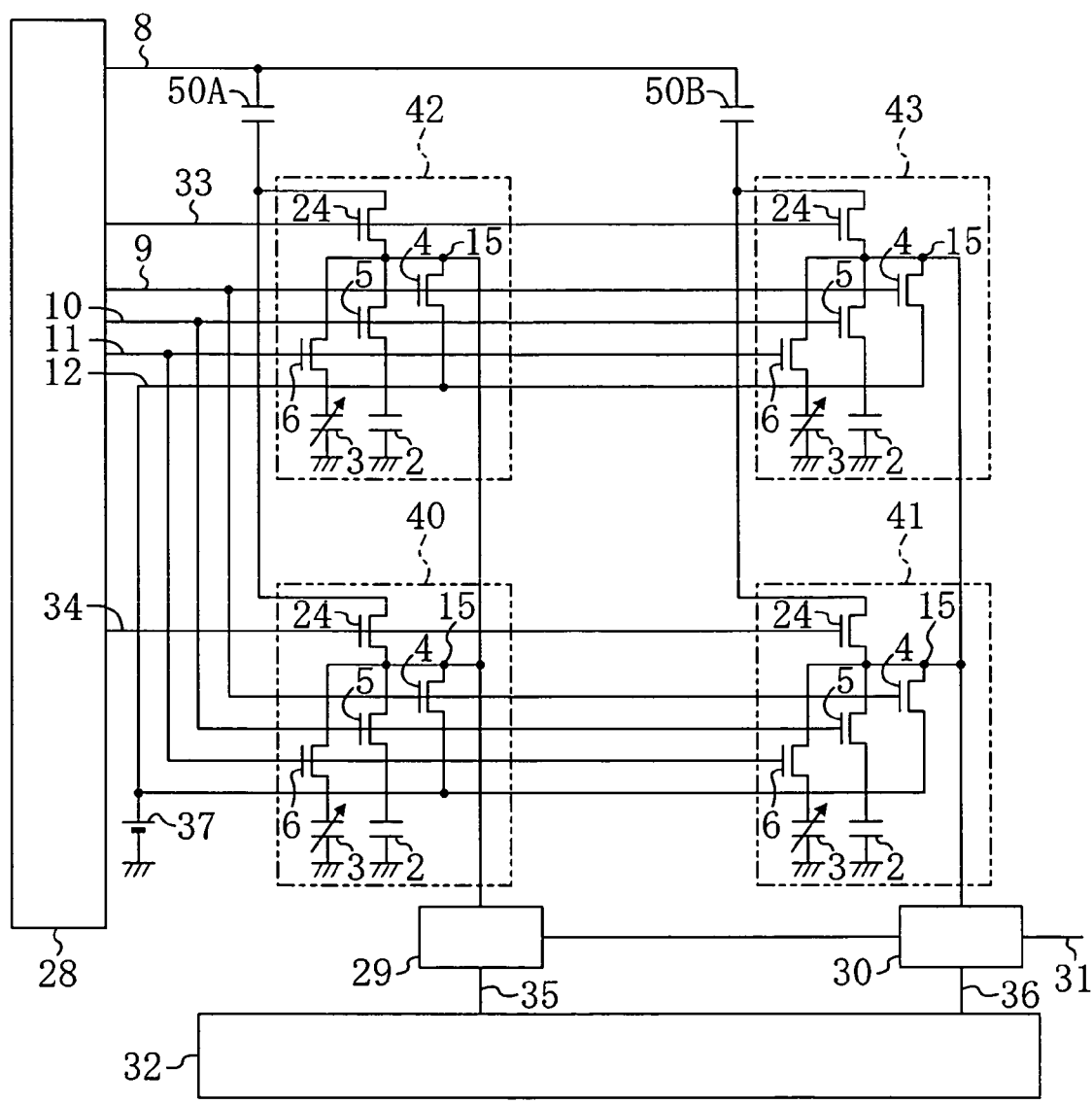
FIG. 8 is a basic circuit diagram showing an example of an infrared sensor array according to a fourth embodiment of the present invention.

A fourth embodiment of the present invention will now be described with reference to the drawings. FIG. 8 shows a basic circuit configuration of an infrared sensor array of the present embodiment. As shown in FIG. 8, a series capacitor element 50A is provided between the power supply line 8 and the power supply line switches 24 of infrared sensors 40 and 42. Thus, the infrared sensor 40 and the infrared sensor 42 forming the first column of the matrix pattern share a series capacitor element. Similarly, an infrared sensor 41 and an infrared sensor 43 forming the second column of the matrix pattern share a series capacitor element 50B.

With such a configuration, it is necessary to adjust the timing with which to drive the reference capacitor element control line and the infrared-detecting capacitor element control line, but it is possible to reduce the size of the infrared sensor array. By allocating the area, which is allocated to the series capacitor element, to the infrared-detecting capacitor element, it is possible to increase the size of the infrared-detecting capacitor element and to increase the detection sensitivity.

While series capacitor elements are shared in the present embodiment, reference capacitor elements may be shared. While a series capacitor element is shared by each column in the above example, it may be shared by each row or in any other manners irrespective of the rows and columns. While FIG. 8 shows an example of a 2×2 pattern, the number of rows and the number of columns are not limited to any particular number.

Figure 9:
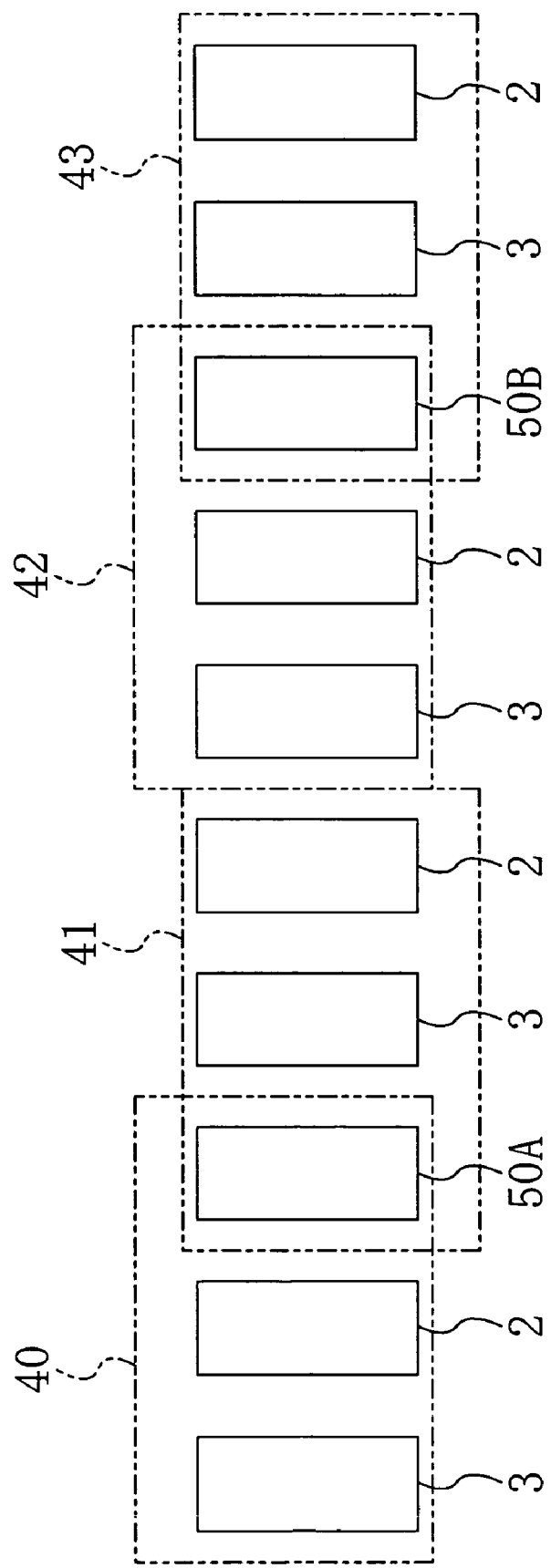
FIG. 9 is a planar view showing an example of an arrangement of an infrared sensor array according to the fourth embodiment of the present invention.

FIG. 9 shows an example of a planar arrangement of elements of the infrared sensor array on the substrate according to the present embodiment. As shown in FIG. 9, the infrared sensor 40 includes the reference capacitor element 2, the infrared-detecting capacitor element 3 and the series capacitor element 50A in this order from left to right, and the infrared sensor 41 includes the reference capacitor element 2, the infrared-detecting capacitor element 3 and the series capacitor element 50A in this order from right to left. The infrared sensor 40 and the infrared sensor 41 are provided next to each other so as to be in left-right symmetry with respect to the series capacitor element 50A, and the infrared sensor 40 and the infrared sensor 41 share the series capacitor element 50A.

Similarly, the infrared sensor 42 and the infrared sensor 43 share the series capacitor element 50B. Thus, each set of infrared sensors including two infrared sensors share a series capacitor element, whereby it is possible to save the area of one series capacitor element and to reduce the size of the infrared sensor array. If the area of other capacitor elements is increased by the area of the omitted series capacitor element, it is possible to increase the sensitivity without increasing the area occupied by the infrared sensor array.

Figure 10:
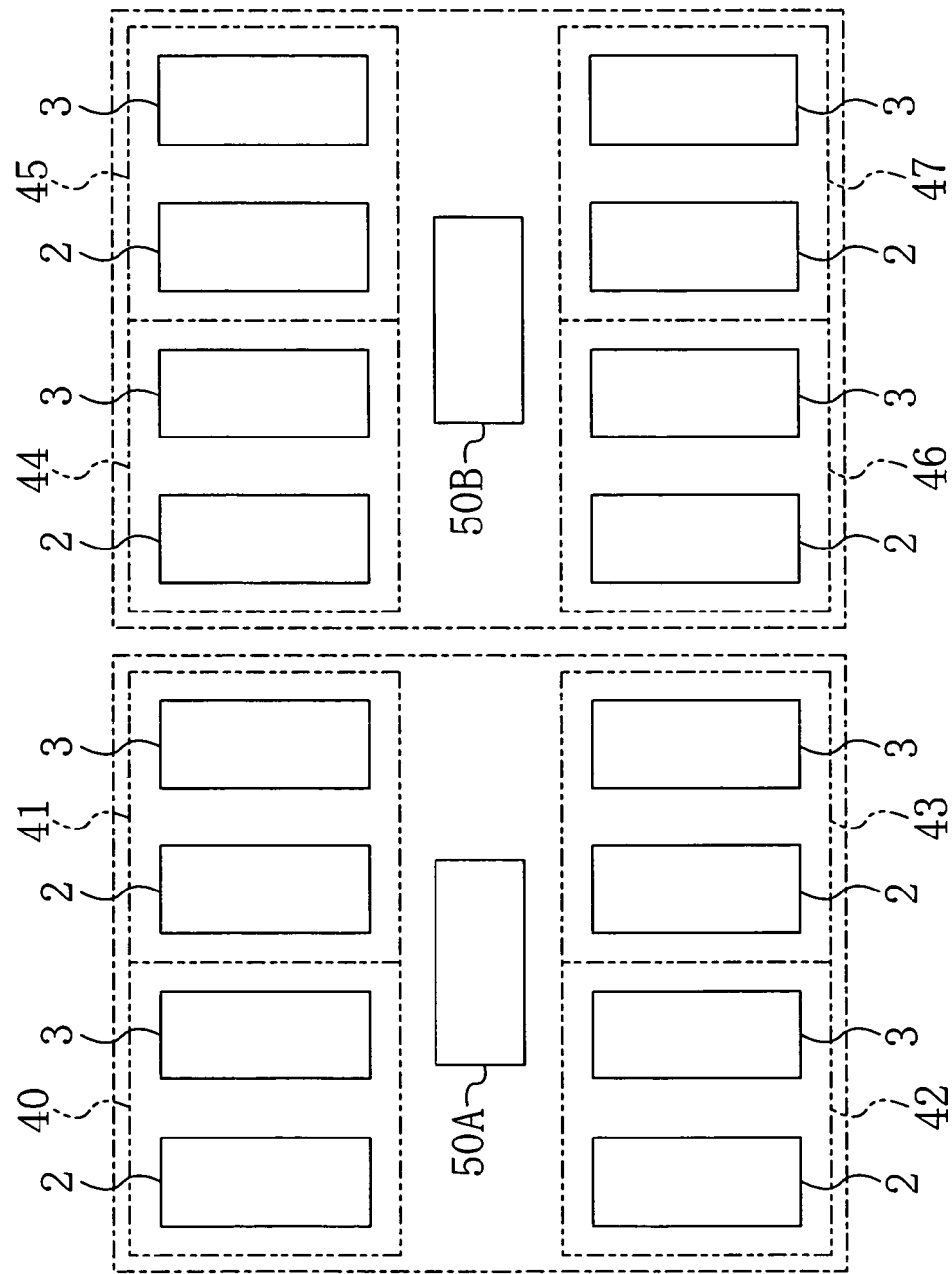
FIG. 10 is a planar view showing an example of an arrangement of an infrared sensor array according to the fourth embodiment of the present invention.

FIG. 10 shows another example of a planar arrangement of elements of the infrared sensor array on the substrate according to the present embodiment. As shown in FIG. 10, a set of four infrared sensors, i.e., the infrared sensor 40, the infrared sensor 41, the infrared sensor 42 and the infrared sensor 43, share the series capacitor element 50A. It is possible to save the area of three series capacitor elements per four infrared sensors, thus allowing an increase in the area of the infrared-detecting capacitor element, whereby it is possible to further increase the sensitivity.

Figure 11:
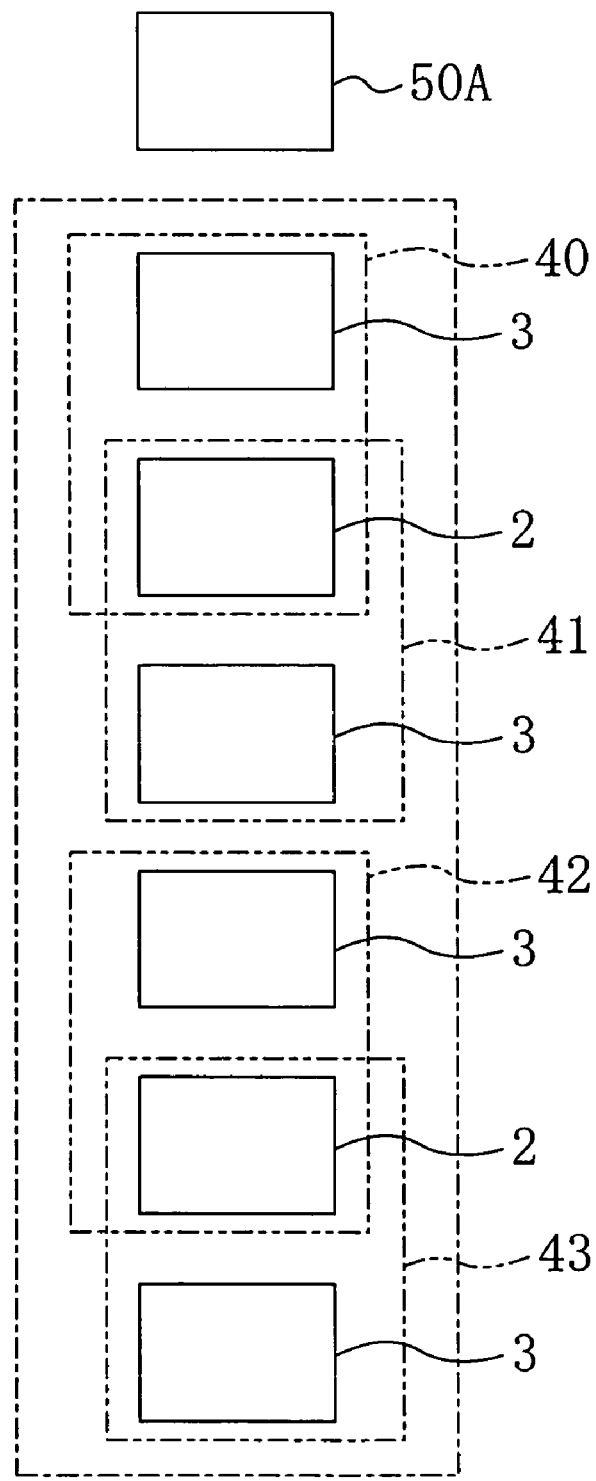
FIG. 11 is a planar view showing an example of an arrangement of an infrared sensor array according to the fourth embodiment of the present invention.

FIG. 11 shows an example of a planar arrangement of elements on the substrate in a case where a reference capacitor element is shared. The infrared sensor 40 including the infrared-detecting capacitor element 3 and the infrared sensor 41 including the infrared-detecting capacitor element 3 are provided next to each other, sharing the reference capacitor element 2 in the middle. Similarly, the infrared sensor 42 including the infrared-detecting capacitor element 3 and the infrared sensor 43 including the infrared-detecting capacitor element 3 are provided next to each other, sharing the reference capacitor element 2 in the middle. The series capacitor element 50A to be shared by the four infrared sensors is provided outside the region in which the set of four infrared sensors are provided.

Figure 12:
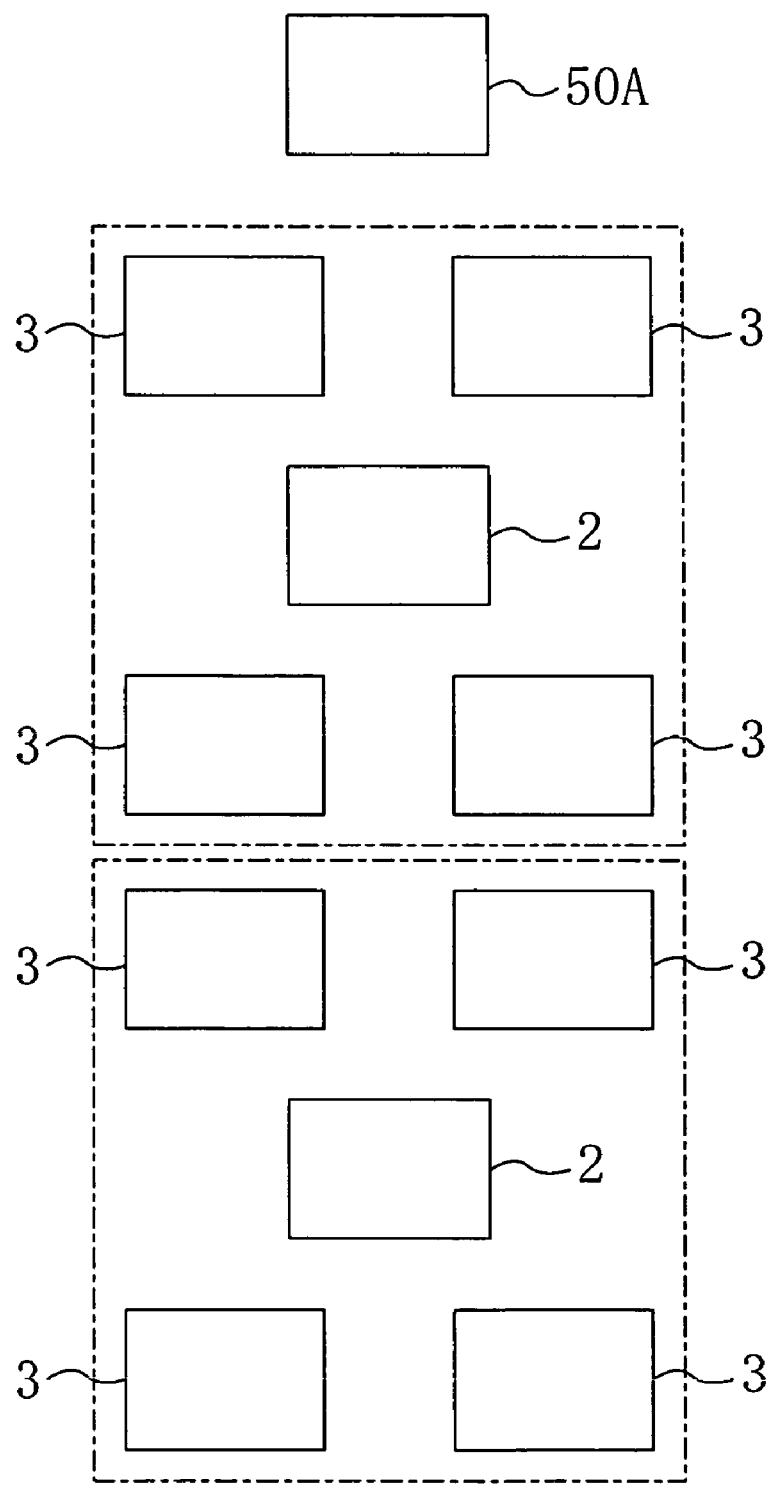
FIG. 12 is a planar view showing an example of an arrangement of an infrared sensor array according to the fourth embodiment of the present invention.

FIG. 12 shows an example of a planar arrangement of elements in a case where each set of four infrared sensors share one reference capacitor element 2, and where two sets of infrared sensors each including four infrared sensors and each sharing one reference capacitor element 2, i.e., a total of eight infrared sensors, share one series capacitor element.

If not only the series capacitor elements but also the reference capacitor elements are shared, it is possible to reduce the area occupied by the reference capacitor elements, whereby it is possible to increase the area of the infrared-detecting capacitor element and thus to realize an infrared sensor array of a high sensitivity.

Also in the infrared sensor array of the present embodiment, an output circuit such as a source follower circuit may be provided as in the third embodiment.

Fifth Embodiment

Figure 13:
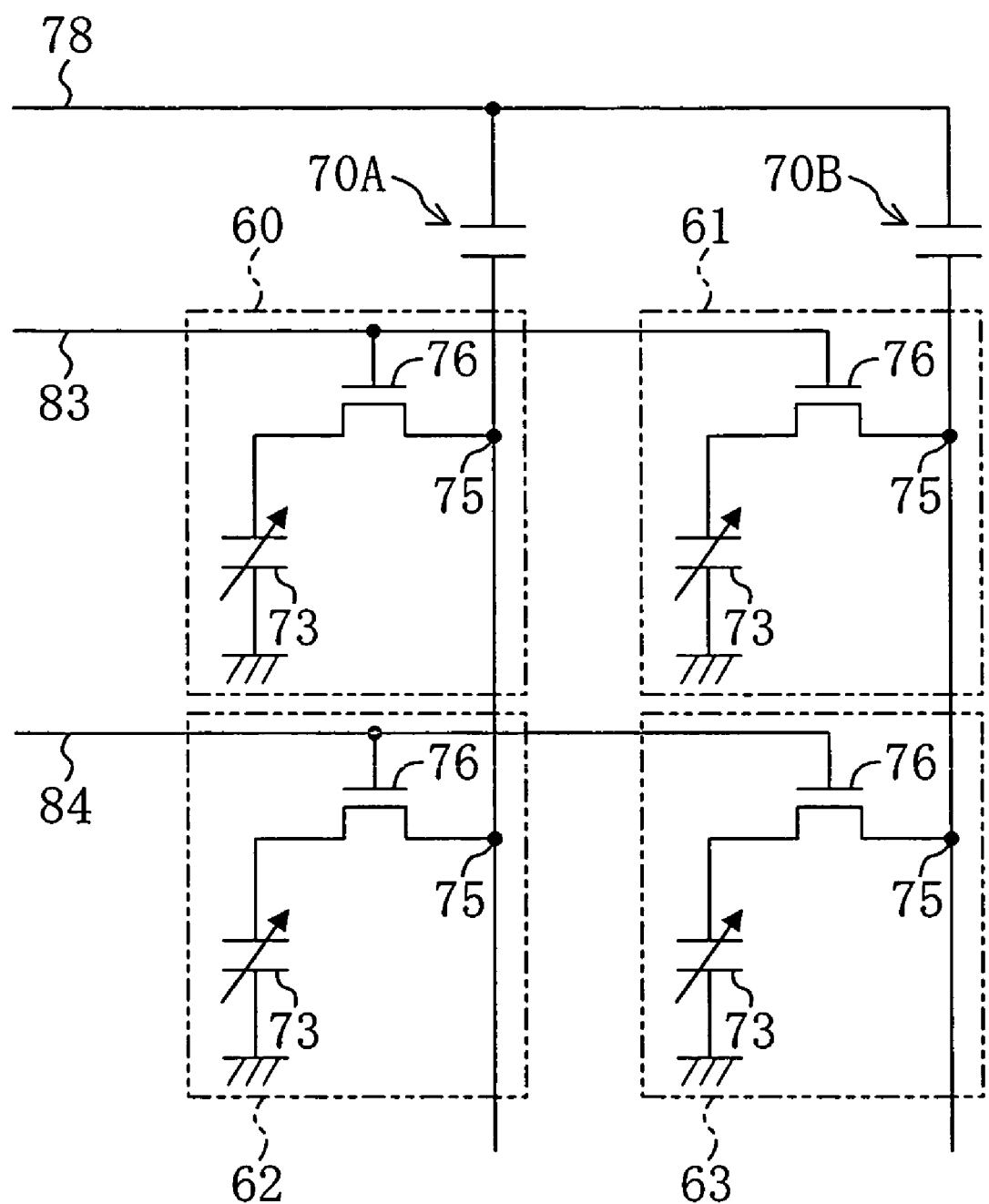
FIG. 13 is a circuit diagram showing an example of an important part of an infrared light array according to a fifth embodiment of the present invention.

A fifth embodiment of the present invention will now be described with reference to the drawings. FIG. 13 shows a basic circuit configuration of an important part of an infrared sensor array of the present embodiment. As shown in FIG. 13, each set of infrared sensors of the infrared sensor array of the present embodiment that are arranged along the same column share a series capacitor element. For example, an infrared sensor 60 and an infrared sensor 62, which are arranged along the first column, share a series capacitor element 70A, and an infrared sensor 61 and an infrared sensor 63, which are arranged along the second column, share a series capacitor element 70B.

Moreover, in the infrared sensor of the present embodiment, the reference capacitor element is omitted. For example, in the infrared sensor 60, the first terminal of an infrared-detecting capacitor element 73 is connected to the second terminal of the series capacitor element 70A whose first terminal is connected to a power supply line 78 via a selection switch 76 being a MOS transistor. The second terminal of the infrared-detecting capacitor element 73 is grounded. The capacitance value of the series capacitor element 70A is set to be equal to the capacitance value when there is no infrared light incident on the infrared-detecting capacitor element 73.

Therefore, when the voltage of a first vertical scanning line 83 is brought to the "H" level to turn ON the selection switch 76 of the infrared sensor 60, the voltage output to a node 75, to which the series capacitor element 70A and the selection switch 76 are connected, is a voltage obtained by distributing the voltage applied between the power supply line 78 and the ground according to the capacitance ratio between the series capacitor element 70A and the infrared-detecting capacitor element 73.

Therefore, when there is no infrared light incident on the infrared-detecting capacitor element 73, there occurs an offset due to a variation between the capacitance value of the series capacitor element 70A and the capacitance value of the infrared-detecting capacitor element 73. In the infrared sensor array of this variation, however, since each set of infrared sensors that are arranged along the same column share a series capacitor element, there occurs substantially the same offset in each of the set of infrared sensors arranged in the column direction. Therefore, the offset correction can be done at once for each column, whereby it is possible to easily realize an infrared sensor array with a simple configuration that is yet capable of very accurate temperature measurement.

Figure 14:
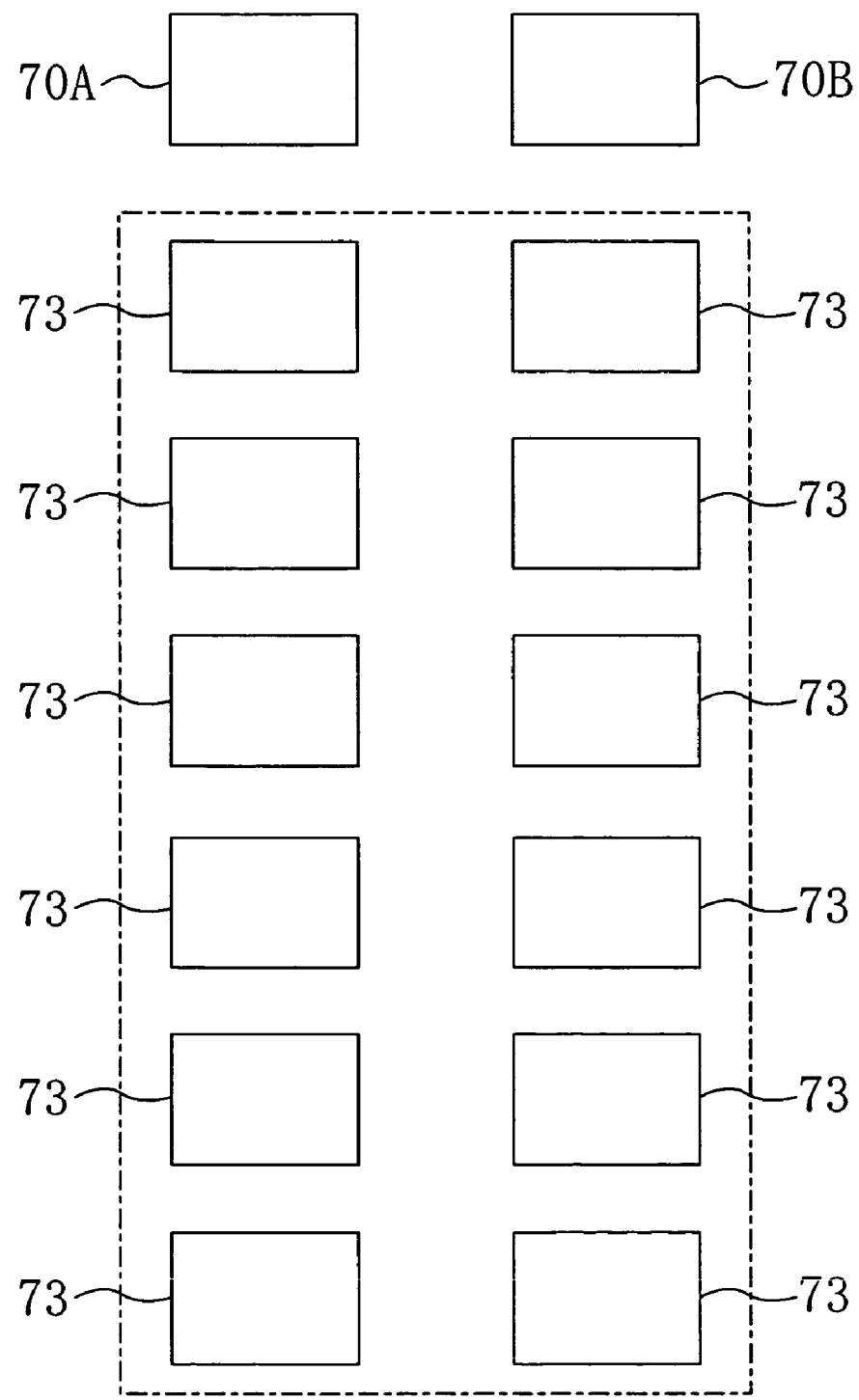
FIG. 14 is a planar view showing an example of an arrangement of an infrared sensor array according to the fifth embodiment of the present invention.

In the infrared sensor array of the present embodiment, each column shares a series capacitor element. Therefore, it requires only a small space for the provision of the series capacitor elements. FIG. 14 shows an example of a planar arrangement of the infrared sensor array of this variation. FIG. 14 shows a case where six infrared sensors are arranged along each column. Since there is no space occupied by the reference capacitor elements and there is hardly needed any space to be occupied by the series capacitor elements, it is possible to increase the area of the infrared-detecting capacitor element, and thus to realize an infrared sensor array with a high sensitivity.

Also in the present embodiment, the number of rows and the number of columns along which infrared sensors are arranged are not limited to any particular number.

Sixth Embodiment

A sixth embodiment of the present invention will now be described with reference to the drawings. The infrared sensor array of the present embodiment includes a charge storage circuit section between a differential circuit and a common output line. For example, a charge storage circuit section is provided between the common output line 31 and the outputs of the first differential circuit section 29 and the second differential circuit section 30 of the infrared sensor array shown in the FIG. 3. A signal from an infrared sensor being selected by an infrared sensor selecting circuit section that is formed by the vertical scanning and signal controlling section 28 and the horizontal scanning section 32 is repeatedly input to the charge storage circuit section a predetermined number of times and accumulated as a charge, and accumulated charges are combined together and output to the common output line 31.

Figure 15:
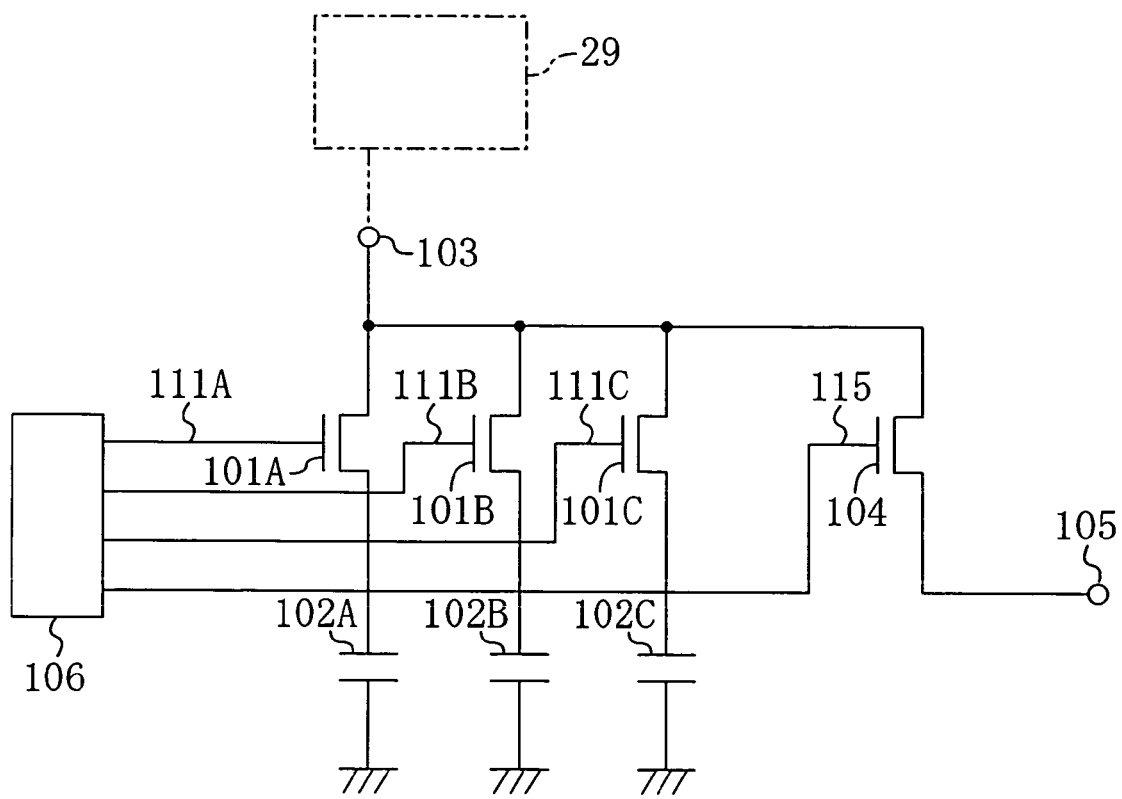
FIG. 15 is a basic circuit diagram showing an example of charge storage means used in an infrared sensor array according to the sixth embodiment of the present invention.

FIG. 15 shows an example of a charge storage circuit section used in the infrared sensor array of the present embodiment. As shown in FIG. 15, three sets of elements are connected in parallel to one another between an input terminal 103 of the charge storage circuit section and the ground, the first set including a storage control switch 101A being a MOS transistor and a charge storage capacitor element 102A, the second set including a storage control switch 101B and a charge storage capacitor element 102B, and the third set including a storage control switch 101C and a charge storage capacitor element 102C. An output control switch 104 being a MOS transistor is connected in series between the input terminal 103 and an output terminal 105.

The gates of the storage control switch 101A, the storage control switch 101B and the storage control switch 101C are connected to a control circuit 106 via a storage control line 111A, a storage control line 111B and a storage control line 111C, respectively, and the output control switch 104 is connected to the control circuit 106 via an output control line 115.

An operation of the infrared sensor array of the present embodiment will now be described with respect to a charge storage circuit section being connected to the first differential circuit section 29.

Figure 16:
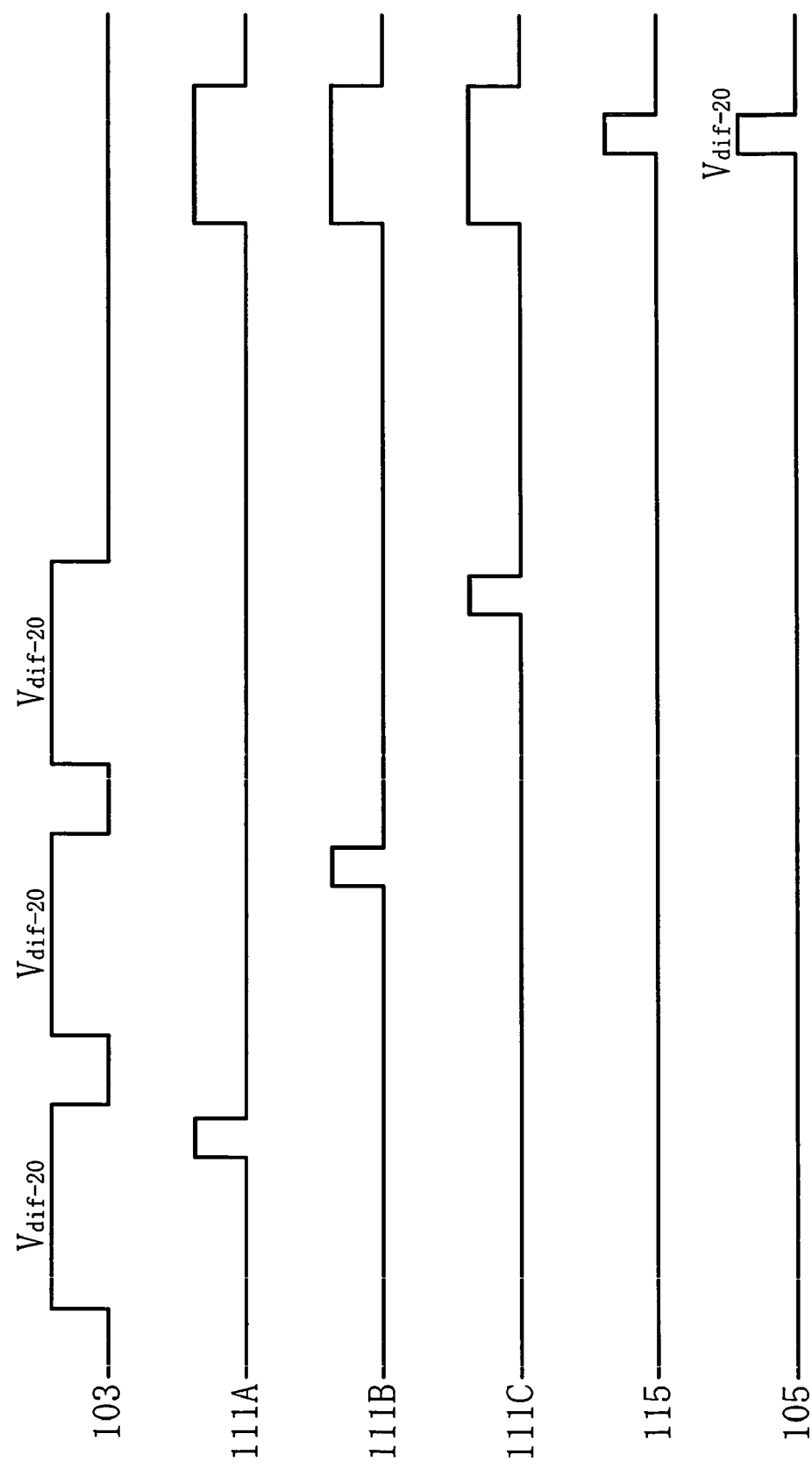
FIG. 16 is a timing diagram showing an operation of charge storage means used in an infrared sensor array according to the sixth embodiment of the present invention.
Figure 17:
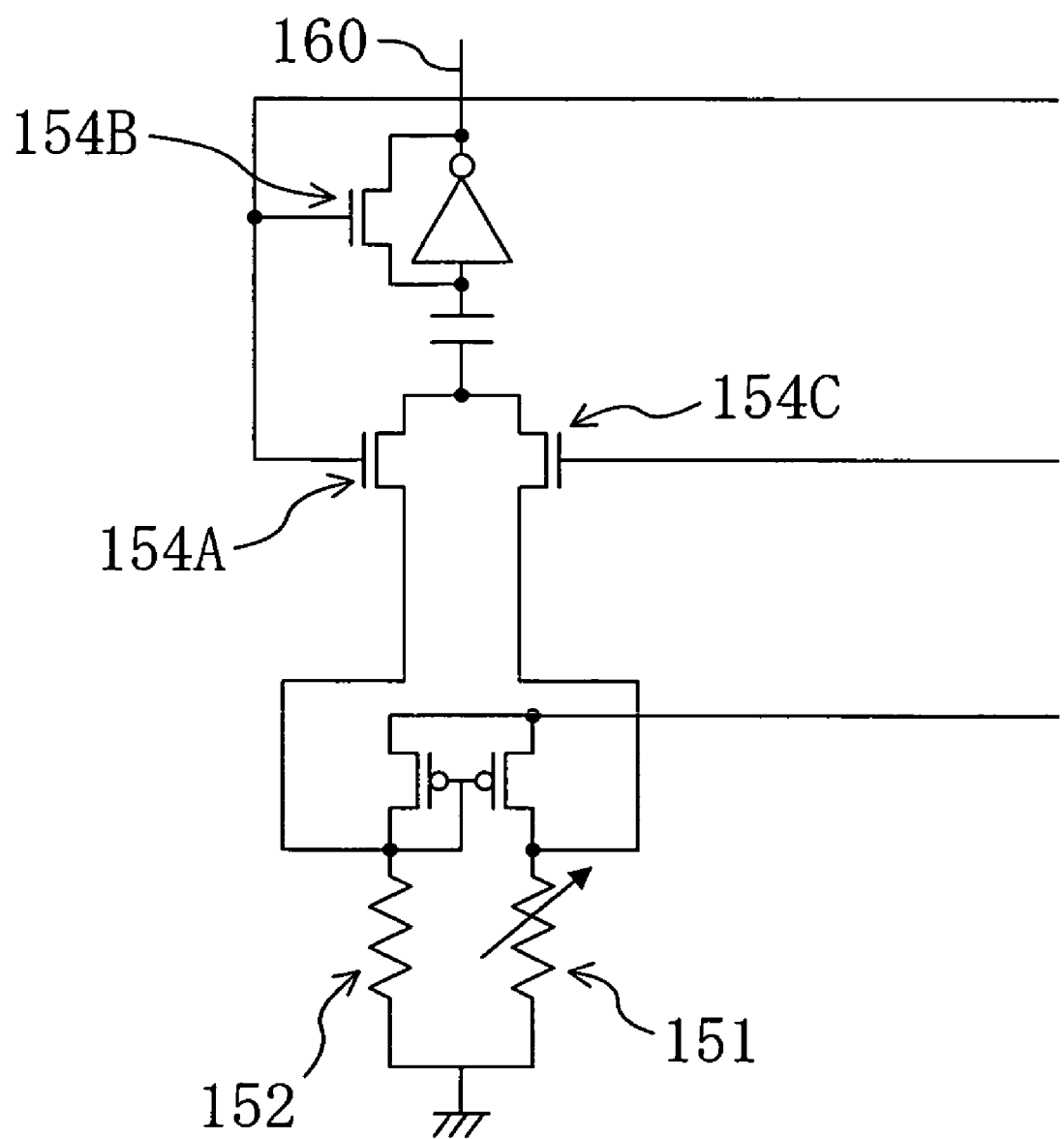
FIG. 17 is a basic circuit diagram showing a reading circuit of a conventional resistive infrared sensor.
Figure 18:
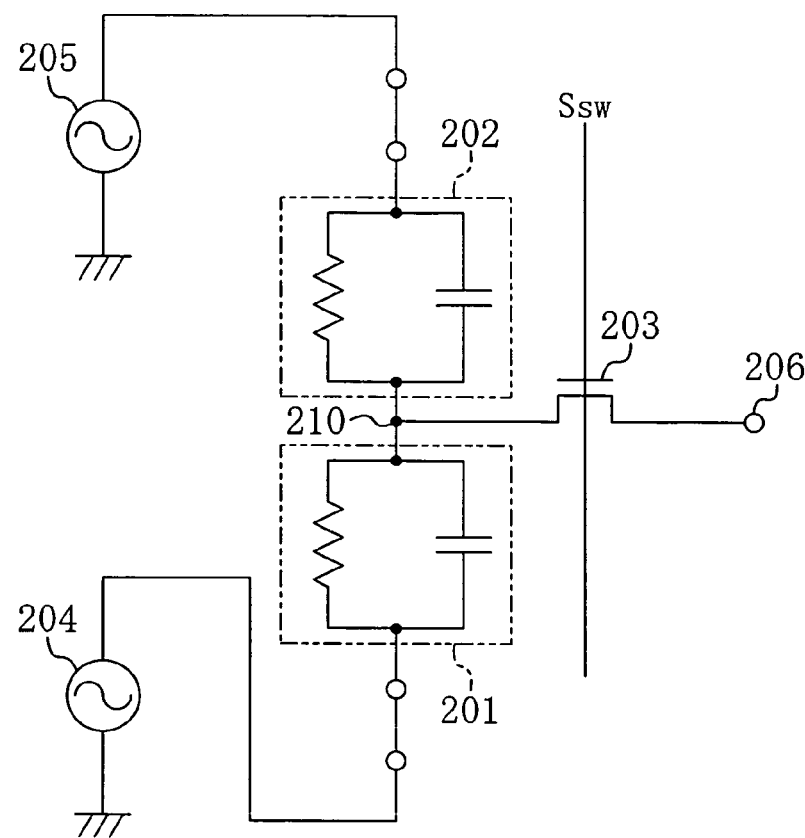
FIG. 18 is a basic circuit diagram showing a conventional dielectric bolometer-type infrared sensor.
Figure 19:
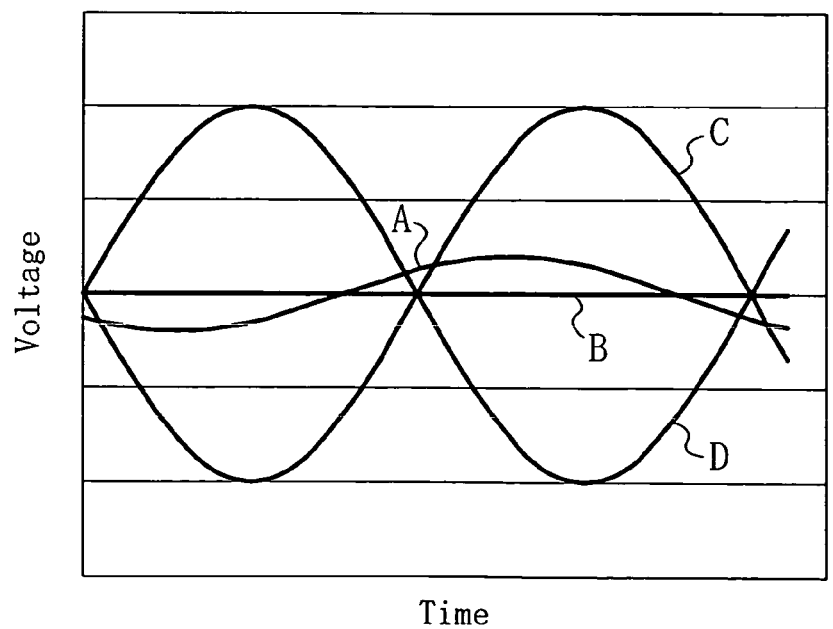
FIG. 19 is a diagram showing driving signals of a conventional dielectric bolometer-type infrared sensor.

FIG. 16 shows timing with which to operate the charge storage circuit section provided in the infrared sensor array of the present embodiment. First, the operation from time T0 to time T7 shown in FIG. 4 is performed, after which a driving pulse is applied to the first horizontal scanning line 35, thereby making the first differential circuit section 29 output a signal $V_{dif-20}$ from the infrared sensor 20 for the first time. A pulse is applied to the storage control line 111A at the time of the signal output from the first differential circuit section 29, thereby storing, as a charge, the signal from the first differential circuit section 29 in the charge storage capacitor element 102A.

Then, the operation from time T0 to time T7 is performed again, thereby making the first differential circuit section 29 output the signal $V_{dif-20}$ from the infrared sensor 20 for the second time. A pulse is applied to the storage control line 111B at the time of the signal output from the first differential circuit section 29, thereby storing a charge in the charge storage capacitor element 102B. A similar scanning operation is further repeated, whereby the signal $V_{dif-20}$ is output from the infrared sensor 20 for the third time and is stored, as a charge, in the charge storage capacitor element 102C.

Then, the voltages of the storage control line 111A, the storage control line 111B and the storage control line 111C are brought to the "H" level, thereby connecting the charge storage capacitor element 102A, the charge storage capacitor element 102B and the charge storage capacitor element 102C in parallel to one another, thus combining the charges accumulated in the charge storage capacitor element 102A, the charge storage capacitor element 102B and the charge storage capacitor element 102C. At the same time, the voltage of an output control line 115 is brought to the "H" level, thereby making the common output line 31 of the infrared sensor array output the signal $V_{dif-20}$ obtained by combining together the three signals from the infrared sensor 20. A similar operation is performed also for the infrared sensors 22 of the second row. A similar operation is performed in parallel also for the charge storage circuit connected to the second differential circuit section 30, thus making it possible to read out data from the entire infrared sensor array.

Thus, in the infrared sensor array of the present embodiment, three signal charges connected in parallel to one another are combined together, whereby the noise becomes $3^{0.5}$ while the signal output value stays the same, thus improving the S/N. While three charge storage capacitor elements are provided in parallel to one another in the present embodiment, the number of charge storage capacitor elements to be provided may be any number greater than or equal to two. An output circuit such as a source follower circuit may be provided as in the third embodiment, or a portion of the reference capacitor element may be shared as in the fourth embodiment.

In order to improve the sensitivity, it is preferred to use, in a capacitor element, a dielectric material whose primary component is barium titanate.

INDUSTRIAL APPLICABILITY

With the infrared sensor of the present invention, it is possible to realize an infrared sensor and an infrared sensor array in which it is not necessary to correct a temperature change of the semiconductor substrate, and to realize an infrared sensor and an infrared sensor array capable of obtaining a signal with a small offset and a large S/N ratio without complicating the circuit configuration. Therefore, the present invention is useful as an infrared sensor, an infrared sensor array, or the like, for detecting infrared light being radiated from an object and a human body.

The invention claimed is:

1. An infrared sensor, comprising:
    a series capacitor element and a reference capacitor element each exhibiting a predetermined capacitance value;
    an infrared-detecting capacitor element whose capacitance value varies depending on an intensity of infrared light incident on the element; and
    an output node being a node at which a first terminal of the series capacitor element, a first terminal of the reference capacitor element and a first terminal of the infrared-detecting capacitor element are connected to one another, wherein:
    a potential of the output node is brought to a reference potential by applying a predetermined voltage between a second terminal of the series capacitor element and a second terminal of the reference capacitor element;
    a potential of the output node is brought to a detection potential by applying the predetermined voltage between the second terminal of the series capacitor element and a second terminal of the infrared-detecting capacitor element; and
    the intensity of infrared light is output as a potential difference between the reference potential and the detection potential.

2. The infrared sensor of claim 1, wherein the capacitance value of the series capacitor element and the capacitance value of the reference capacitor element are equal to the capacitance value of the infrared-detecting capacitor element when there is no infrared light incident on the infrared-detecting capacitor element.

3. The infrared sensor of claim 1, further comprising:
a reference capacitor element control switch provided between the first terminal of the reference capacitor element and the output node; and
an infrared-detecting capacitor element control switch provided between the first terminal of the infrared-detecting capacitor element and the output node, wherein:
a power supply for supplying the predetermined voltage is connected to the second terminal of the series capacitor element;
the reference potential is obtained by turning ON the reference capacitor element control switch and turning OFF the infrared-detecting capacitor element control switch; and
the detection potential is obtained by turning OFF the reference capacitor element control switch and turning ON the infrared-detecting capacitor element control switch.

4. An infrared sensor array, comprising a plurality of infrared sensors arranged in a two-dimensional matrix pattern, wherein each infrared sensor includes:
a series capacitor element and a reference capacitor element each exhibiting a predetermined capacitance value;
an infrared-detecting capacitor element whose capacitance value varies depending on an intensity of infrared light incident on the element; and
an output node being a node at which a first terminal of the series capacitor element, a first terminal of the reference capacitor element and a first terminal of the infrared-detecting capacitor element are connected to one another, wherein:
a potential of the output node is brought to a reference potential by applying a predetermined voltage between a second terminal of the series capacitor element and a second terminal of the reference capacitor element;
a potential of the output node is brought to a detection potential by applying the predetermined voltage between the second terminal of the series capacitor element and a second terminal of the infrared-detecting capacitor element; and
the intensity of infrared light is output as a potential difference between the reference potential and the detection potential.

5. The infrared sensor array of claim 4, wherein the capacitance value of the series capacitor element and the capacitance value of the reference capacitor element are equal to the capacitance value of the infrared-detecting capacitor element when there is no infrared light incident on the infrared-detecting capacitor element.

6. The infrared sensor array of claim 4, wherein each infrared sensor includes:
a reference capacitor element control switch provided between the first terminal of the reference capacitor element and the output node; and
an infrared-detecting capacitor element control switch provided between the first terminal of the infrared-detecting capacitor element and the output node, wherein:
a power supply for supplying the predetermined voltage is connected to the second terminal of the series capacitor element;
the reference potential is obtained by turning ON the reference capacitor element control switch and turning OFF the infrared-detecting capacitor element control switch; and
the detection potential is obtained by turning OFF the reference capacitor element control switch and turning ON the infrared-detecting capacitor element control switch.

7. The infrared sensor array of claim 4, further comprising a differential circuit section for storing the reference potential and the detection potential, and for outputting a difference between the stored reference potential and the stored detection potential.

8. The infrared sensor array of claim 7, further comprising an impedance conversion circuit or an amplifier circuit provided between each output node and each differential circuit section.

9. The infrared sensor array of claim 4, wherein a predetermined group of two or more of infrared sensors, among the plurality of infrared sensors, share at least one of the series capacitor element and the reference capacitor element.

10. The infrared sensor array of claim 4, wherein a group of infrared sensors, among the plurality of infrared sensors, that are connected to the same row or the same column of the matrix pattern share at least one of the series capacitor element and the reference capacitor element.

11. The infrared sensor array of claim 4, further comprising:
a sensor selecting circuit section for selecting one of the plurality of infrared sensors; and
a charge storage circuit section for accumulating a charge according to the potential difference output from the selected infrared sensor over a predetermined number of times, and for outputting a charge obtained by combining together the charge accumulated over the predetermined number of times, wherein:
the charge storage circuit section includes a plurality of capacitor elements connected between a terminal receiving the potential difference and a ground each via a switch therebetween;
the charge storage circuit section includes a driving circuit for driving the switch; and
a charge is stored in each capacitor element.

12. An infrared sensor array, comprising:
a plurality of infrared sensors arranged in a two-dimensional matrix pattern; and
a plurality of series capacitor elements each exhibiting a predetermined capacitance value, wherein:
each infrared sensor includes an infrared-detecting capacitor element whose capacitance value varies depending on an intensity of infrared light incident on the element, and a selection switch whose first terminal is connected to a first terminal of the infrared-detecting capacitor element; and
second terminals of the selection switches included in the infrared sensors that are arranged along the same column of the matrix pattern all share the same series capacitor element.

* * * * *